US010783458B2

(12) United States Patent
Fernandez-Ivern et al.

(10) Patent No.: US 10,783,458 B2
(45) Date of Patent: Sep. 22, 2020

(54) SYSTEMS AND METHODS FOR SCREENING SUBMISSIONS IN PRODUCTION COMPETITIONS

(75) Inventors: Javier Fernandez-Ivern, Rocky Hill, CT (US); David Messinger, West Hartford, CT (US); John M. Hughes, Hebron, CT (US)

(73) Assignee: TopCoder, Inc., Glastonbury, CT (US)

( * ) Notice: Subject to any disclaimer, the term of this patent is extended or adjusted under 35 U.S.C. 154(b) by 1733 days.

(21) Appl. No.: 11/415,392

(22) Filed: May 1, 2006

(65) Prior Publication Data
US 2007/0288107 A1    Dec. 13, 2007

(51) Int. Cl.
*G06Q 10/00* (2012.01)
*G06Q 30/02* (2012.01)
*G06Q 10/10* (2012.01)

(52) U.S. Cl.
CPC ............ *G06Q 10/00* (2013.01); *G06Q 10/10* (2013.01); *G06Q 30/02* (2013.01); *G06Q 30/0201* (2013.01)

(58) Field of Classification Search
USPC .............................................. 705/1, 1.1, 500
See application file for complete search history.

(56) References Cited

U.S. PATENT DOCUMENTS

| | | | |
|---|---|---|---|
| 4,525,599 A | 6/1985 | Curran et al. | 178/22.08 |
| 5,779,549 A | 7/1998 | Walker et al. | 463/42 |
| 5,794,207 A | 8/1998 | Walker et al. | 705/23 |
| 5,827,070 A | 10/1998 | Kershaw et al. | 434/322 |
| 5,916,024 A | 6/1999 | Von Kohorn | 463/40 |
| 5,933,811 A | 8/1999 | Angles et al. | 705/14 |
| 5,947,747 A | 9/1999 | Walker et al. | 434/354 |
| 6,010,403 A | 1/2000 | Adam et al. | 463/6 |
| 6,112,049 A | 8/2000 | Sonnenfeld | 434/350 |
| 6,264,560 B1 | 7/2001 | Goldberg et al. | 463/42 |
| 6,293,865 B1 | 9/2001 | Kelly et al. | 463/16 |
| 6,301,574 B1 | 10/2001 | Thomas et al. | 707/1 |
| 6,345,239 B1 | 2/2002 | Bowman-Amuah | 703/6 |
| 6,356,909 B1 | 3/2002 | Spencer | 707/10 |
| 6,397,197 B1 | 5/2002 | Gindlesperger | 75/37 |
| 6,408,283 B1 | 6/2002 | Alaia et al. | 705/37 |
| 6,427,132 B1 | 7/2002 | Bowman-Amuah | 702/22 |
| 6,513,042 B1 | 1/2003 | Anderson et al. | 707/102 |

(Continued)

FOREIGN PATENT DOCUMENTS

WO    WO 97/39811    10/1997    ......... 24/24

OTHER PUBLICATIONS

PCT/US20071010414, International Preliminary Report on Patentability, Written Opinion of the International Searching Authority, dated Oct. 30, 2008, pp. 1-5.*

(Continued)

*Primary Examiner* — Sangeeta Bahl
(74) *Attorney, Agent, or Firm* — Goodwin Procter LLP

(57) ABSTRACT

The invention relates to a system and method for screening submissions in a production contest system. In one embodiment, the method includes receiving a production competition submission from a contestant, automatically screening the submission with a screening system to verify that the submission meets predetermined requirements, and providing feedback to the contestant and a contest administrator regarding the results of whether the submission meets the predetermined requirements.

17 Claims, 10 Drawing Sheets

(56) References Cited

U.S. PATENT DOCUMENTS

| | | | | |
|---|---|---|---|---|
| 6,569,012 | B2* | 5/2003 | Lydon et al. | 463/9 |
| 6,658,642 | B1 | 12/2003 | Megiddo et al. | 717/101 |
| 6,662,194 | B1 | 12/2003 | Joao | 707/104.1 |
| 6,895,382 | B1 | 5/2005 | Srinivasan et al. | 705/7 |
| 6,915,266 | B1 | 7/2005 | Saeed et al. | 705/2 |
| 7,300,346 | B2* | 11/2007 | Lydon et al. | 463/9 |
| 2001/0032189 | A1 | 10/2001 | Powell | 705/59 |
| 2001/0034631 | A1 | 10/2001 | Kiselik | 705/8 |
| 2001/0037281 | A1 | 11/2001 | French et al. | 705/37 |
| 2001/0039529 | A1 | 11/2001 | Hoffman | 705/37 |
| 2001/0049615 | A1 | 12/2001 | Wong et al. | 705/8 |
| 2002/0194319 | A1* | 12/2002 | Ritche | 709/223 |
| 2003/0192029 | A1* | 10/2003 | Hughes | G06F 8/20 717/101 |
| 2006/0052886 | A1* | 3/2006 | Lydon et al. | 700/91 |
| 2007/0244570 | A1* | 10/2007 | Speiser et al. | 700/1 |
| 2007/0244585 | A1* | 10/2007 | Speiser | A63F 13/12 700/91 |

OTHER PUBLICATIONS

U.S. Appl. No. 10/377,343, filed Feb. 28, 2003, Lydon et al.
U.S. Appl. No. 10/377,344, filed Feb. 28, 2003, Lydon et al.
U.S. Appl. No. 10/378,539, filed Feb. 28, 2003, Lydon et al.
An Overview of PC2s [online], [Retrieved on Jul. 24, 2006]. Retrieved from the Internet: http://hera.ecs.csus.edu/pc2/pc2desc.html, Revised Oct. 18, 2002.
"I0I Software Team" [online], [Retrieved on Jul. 24, 2006]. Retrieved from the Internet: http://olympiads.win.tue.nl/ioi/st/.
"Ed's Programming Contest Problem Archive" [online], [Retrieved on Jul. 25, 2006]. Retrieved from the Internet: http://www.karrels.org/Ed/ACM/index.html.
"ACM/IBM Quest for Java 2000" [online], [Retrieved on Jul. 25, 2006]. Retrieved from the Internet:http://www.acm.org/jquest/.
"Hack the Web for Fun!" [online], [Retrieved on Jul. 26, 2006]. Retrieved from the Internet: http://web.archive.org/web/20000816205559/http://java.sun.com/contest/external.html.
"Brainbench the measure of achievement" [online], [Retrieved on Nov. 9, 2000]. Retrieved from the Internet: http://www.brainbench.com/xml/bb/homepage.xml.
"Problem Set Archive with Online Judge" [online], [Retrieved on Jul. 26, 2006]. Retrieved from the Internet: http://acm.uva.es/problemset/.
Lewis, "Tournaments become latest high-tech recruiting tool," The Boston Globe at C1, May 6, 2002.; http://www.cs.berkeley.edu/~hilfingr/programming-contest/acm-news-05-10-2002.txt—*Replacement text, retrieved from the Internet on Jul. 25, 2006.
Annavajjala, "JAVA Challenge Software Project" Master's Thesis submitted to the Department of Computer Science and Electrical Engineering at West Virginia University.
Astrachan, O. "The Internet Programming Contest: A Report and Philosophy" Association for Computing Machinery, Feb. 1993; Retrieved from the Internet on Jul. 25, 2006 http://www.cs.dartmouth.edu~dfk/papers/astrachan:contest.pdf.
Blecourt, "The Legacy of Arpad Elo: The Development of a Chess Rating System" University of Amsterdam, Dec. 1, 1998.
U.S. Chess Federation [online], [Retrieved on Dec. 3, 2002]. Retrieved from the Internet: http://www.uschess.org/about/about/htmi.
Carlton, Jim. Strutting their data, geeks go to battle for bucks and glory. Wall Street Journal, Mar. 11, 1994, col. 4, pA1(W) & pAl(e), ISSN 0193-241.
Fink, William & Joyce Dick. Computer Programming Tournament as a learning Experience. The Computer Education Quarterly. Summer 1989, vol. 11, Issue 2 pp. 46-52.
O'Sullivan, Kate. "Best of the Web: Testing Recruits, Net-Style" Dec. 2000, pp. 1-5. http://pf.inc.com/magazine/20001201/21124.html , Retrieved from the Internet on Jul. 28, 2006.
Flipcode. Coding contest [online]. 2000 [retrieved on Jul. 26, 2006]. Retrieved from the Internet: http://www.flipcode.com/cgi-bin/fcarticles.cgi?show=62761.
The Eiffel Stuggle 2000, Call for participation [online]. Aug. 2000, retrieved on Jul. 28, 2006]. Retrieved from the Internet: URL: http://www.elj.com/eiffel/struggle2000/cfp/, entire document.
ICFP Functional Programming Contest, [online] 1998, [retrieved on Jul. 26, 2006]. Retrieved from the internet: URL: http://www.ai.mit.edu/extra/icfp-contest.
1999 ICFP Programming Contest, [online] 1999, [retrieved on Jul. 28, 2006]. Retrieved from the internet: URL: http://www.cs.virginia.edu/~jks6b/ocfp/.
"About CBDi" [online], [Retrieved on Jul. 28, 2006]. Retrieved from the Internet: http://www.cbdiforum.com/public/about.php3.
"ComponentSource: About Us" [online], [Retrieved on Jul. 28, 2006]. Retrieved from the Internet: http://www.componentsource.com/services/aboutcomponentsource.asp.
"Flashline 4 Provides Software Asset Management for Enterprise Programs" [online], [Retrieved on Jul. 28, 2006]. Retrieved from the Internet: http://www.flashline.com/fcm/fcm/jsp.
"About ComponentOne" [online], [Retrieved on Jul. 28, 2006]. Retrieved from the Internet: http://www.componentone.com/Company.aspx?ItemType=1&TabTypeID=3&TabMapID=149&ItemID=0&SubCategoryTypeID=0&PanelIndex=2&TabID=176.
"Rogue Wave Corporate Information" [online], [Retrieved on Jul. 28, 2006]. Retrieved from the Internet: http://www.roguewave.com/corp/.
"LogicLibrary Company Overview" [online], [Retrieved on Jul. 28, 2006]. Retrieved from the Internet: http://www.logiclibrary.com/about_us/company_profile.php.
"/n software inc.—General Corporate Information" [online], [Retrieved on Jul. 28, 2006]. Retrieved from the Internet: http://www.nsoftware.com/company/corporateinfo.aspx.
"ILOG Corportae Profile" [online], [Retrieved on Jul. 28, 2006]. Retrieved from the Internet: http://www.ilog.com/corporate/profile/.
"What is SourceForge.net" [online], [Retrieved on Jul. 28, 2006]. Retrieved from the Internet: http://sourceforge.net/docman/display_doc.php?docid=6025&group id=1.
"CollabNet Corporate Background" [online], [Retrieved on Jul. 28, 2006]. Retrieved from the Internet http://www.collab.net/media/pdfs/collabnet_background.pdf.
Office Action for U.S. Pat. No. 6,569,012 dated Jun. 27, 2002.
Office Action for U.S. Pat. No. 6,569,012 dated Aug. 21, 2002.
Final Office Action for U.S. Pat. No. 6,569,012 dated Dec. 6, 2002.
Office Action for Patent Application U.S. Appl. No. 10/377,343 dated Jul. 25, 2003.
Office Action for Patent Application U.S. Appl. No. 10/377,344 dated Jul. 25, 2003.
International Search Report for International Patent Application Serial No. PCT/US03/10537 dated Jul. 17, 2003.
Web Pages from Slashdot.org: http:Hdevelopers.slashdot.org/developers/04/01/26/1834209.shtml?tid=136&tid=155&tid=187&tid=99 retrieved from the Internet on Jan. 28, 2004.
Web Pages from Scwatch.net:—http://www.scwatch.net/modules.php?name=Forums&file=viewtopic&t=16 Retrieved from the Internet on Jan. 28, 2004.
"IBM Patents Method for Paying Open Source Volunteers".posted at http://www.theinquirer,net/Default.aspx?article--13813 Retrieved from the Internet on Jan. 29, 2004.
Web page www. cosource.com (Mar. 21, 2000), as provided by web.archive.org on Mar. 31, 2006 at http://web.archive.org/web/20003021603l6/www.cosource.com.
Weinrich and Altmann, "An Object-oriented Infrastructure for a Cooperative Software Development Environment", 1997, Linz, Austria.
Van Wegberg and Berends, "Competing communities of users and developers of computer software: competition between open source software and commercial software", May 2000, i, 1-13, University of Maastricht, The Netherlands.
Voas, "Certifying Off-the-Shelf Software Components", Jun. 1998, 53-59, Sterling, VA.
Skaf, Charoy and Godart, "Maintaining Consistency of Cooperative Software Development Activities", Vandoeuvre-les-Nancy, France.

(56) References Cited

OTHER PUBLICATIONS

Ward, Donald L. "Aircraft Information Systems Support SOL 9-Bj2-Z19-1-31I DUE 061401 POC" 2 pages, Jun. 11, 2001.
Bennett, Lynda et al. "Forging an Outsourcing Partnership that Works" IPCC 94, pp. 406-410, 1994.
Dhillon, Gurprett Outsourcing of IT service Provision Issues, Concerns and Some Case Examples, 20 pages, Fall 2002.
Forsberg et al., "Managing Outsourcing of Software Development" 48 pages, Spring 2001.
Cooper, Jack et al. "Software Acquisition Capability Maturity Model (SA-CMM_Version 1.03)", Mar. 2002, CMU, Whole Manual.
http://www.programmingbids.com/, informational webpages retrieved from the Internet Nov. 29, 2001, 15 pages.
Kirsner, Scott, "The New Rules", http://www.topcoder.com/index?t=news events&c=article bglobe, downloaded from the Internet Jun. 21, 2006, 4 pages.
Phillips, Margot et al. "Programming Contests: Two Innovative Models from New Zealand", Powerpoint presentation slides printout.
Boersen, Raewyn et al. "Programming Contests: Two Innovative Models from New Zealand", text and description.
Opmanis, Martins "Possible ways to improve Olympiads in Informatics" Powerpoint presentation slides printout.
Opmanis, Martins "Possible ways to improve Olympiads in Informatics" text and description, Institute of Mathematics and Computer Science, University of Latvia, pp. 1-11.
"The Dutch Olympiad in Informatics" Powerpoint presentation slides printout.
van der Vegt, Willem, "The CodeCup, an annual game programming competition" Paper for IOI-workshop, pp. 1-11.
Dagiene, Valentina "Competition in Information Technology—learning in an attractive way", text and description, pp. 1-7.
Yakovenko, Bogdan "50% rule should be changed." pp. 1-4.
Fisher, Maryanne et al. "Gender and Programming Contests: Mitigating Exclusionary Practices" Powerpoint presentation slides printout.
Fisher, Maryanne et al. "Gender and Programming Contests: Mitigating Exclusionary Practices" text and description.
Wang, Hong et al. "Visualization, Antagonism and Opening—Towards the Future of the IOI Contest" for $1^{st}$ Workshop on Computer Science Competitions Reform, Tsinghua University, Beijing, China.
Forisek, Michal "On suitability of programming competition tasks for automated testing" Powerpoint presentation slides printout, 11 pages.
Forisek, Michal "On suitability of programming competition tasks for automated testing" text and description, pp. 1-9.
Cormack, Gordon et al. "Structure, Scoring and Purpose of Computing Competition", text and description, University of Waterloo.
Cormack, Gordon et al. "Structure, Scoring and Purpose of Computing Competition" Powerpoint presentation slides printout, 10 pages.
Cormack, Gord et al. "Structure, Scoring and Purpose of Computing Competition (Part 2)" Powerpoint presentation slides printout, 25 pages.
Pohl, Wolfgang, Suggestions for CS Competitions (Task, Exam, Automatic Grading) Powerpoint presentation slides printout, 7 pages, Dagstuhl, Germany, Jan. 24, 2006.
Pohl, Wolfgang, "Classification of Computer Science Competitions" Powerpoint presentation slides printout, 7 pages, Dagstuhl, Germany, Jan. 23, 2006.
Pohl, Wolfgang, "Computer Science Competitions for High School Students—Approaches to Classification and New Task Types", text and description, 8 pages.
Pohl, Wolfgang, "Computer Science Competitions for High School Students—Approaches to Classification and New Task Types", Extended Abstract, 7 pages.
Manzoor, Shahriar "Analyzing Programming Contest Statistics" (http:/ / online-judge.uva.es/contest/) Southeast University, Dhaka, Bangladesh.
Manzoor, Shahriar "Analyzing Programming Contest Statistics" (http:/ /online-judge.uva.es/p) Southeast University, Dhaka, Bangladesh.
Verhoeff, Tom "The IOI is (Not) a Science Olympiad", Powerpoint presentation slides printout, Jan. 24, 2006, The Netherlands.
Verhoeff, Tom "The IOI is (Not) a Science Olympiad", text and description, Oct. 2005, The Netherlands, 9 pages.
Michalski, Marcin et al. "Plug & Play Contest System" (sio.net), Basic guidelines sheet, Institute of Informatics, Warsaw University, Poland.
Michalski, Marcin et al. "Plug & Play Contest System" (sio.net), text and description, Institute of Informatics, Warsaw University, Poland.
Cormack, Gordon "Random Factors in IOI Test Case Selection" text and description, University of Waterloo, Ontario, Canada.
Cormack, Gordon, "Statistical Analysis of IOI Scoring" Brief description.
Cormack, Gordon "Statistical Analysis of IOI Scoring" Powerpoint presentation slides printout, Jan. 24, 2006.
Retrieved from the Internet, http://www.bwinf.de/competition-workshop/ information sheet, Jul. 12, 2006.
Retrieved from the Internet, http://www.bwinf.de/competition-workshop/papers.html, listing of accepted papers, Jul. 12, 2006.
Programming bids Buyers Request Programmers Bid—Retrieved from the internet, <http://rfg.programmingbids.com/cgi-bin/rfg/feedback.cgi?p=mameon> Feedback provided by buyers by username mamoon, downloaded Aug. 8, 2006.
TopCoder Homepage, <http://web.archive.org/web20010516213901/http://www.topcoder.com/> retrieved Oct. 19, 2006 (1 page).
International Search Report and Written Opinion for PCT/US2007/009477, dated Nov. 21, 2008, 7 pages.

\* cited by examiner

SYSTEMS AND METHODS FOR SCREENING SUBMISSIONS IN PRODUCTION COMPETITIONS

TECHNICAL FIELD

This invention relates to computer-based methods and systems for conducting production competitions, and, more particularly, to methods and systems for screening submissions in production competitions.

BACKGROUND INFORMATION

In the United States and elsewhere, computers have become part of people's everyday lives, both in the workplace and in personal endeavors. This is because a general-purpose computer can be programmed to run a variety of software programs each providing different processing and networking functions. Computers are also used to enable the production of work product.

For example, computer programmers produce computer code. Some companies hire large numbers of computer programmers to produce code on the company's behalf.

One approach companies take is to hire large numbers of programmers and develop software "in house." While this affords significant control over the programming staff, finding, hiring, and maintaining such a staff can be cost prohibitive. Furthermore, as individual programmers leave the company, much of the technical and industrial knowledge is also lost. Alternatively, many companies "outsource" their programming through consulting firms, or contract employees. This approach relieves the company of the burdens of managing individual employees, however the quality and consistency of the work may be suspect, and the challenges of integrating work from numerous outside vendors can be significant.

Another approach is to hold a production competition. In a production competition environment, such as a software design or development contest, contestants compete to submit work product.

In such a competition, submitters may have a number of items that they need to submit, and they may need to submit them in a particular manner, with particular formal requirements. For example, there may be particular files that must be included, with particular file names, directory structures, and so on. The verification of the formal submission requirements may be time consuming, and prone to error.

After submission, reviewers also may need to verify these formal requirements. In some cases, the formal requirements are checked in a preliminary step, as part of a screening process, prior to formal review. The screening process is useful in that submissions that are formally deficient are identified at the time of screening, and so are not put through a more rigorous review process. The screening process, however, can be time consuming, and subject to human error.

SUMMARY OF THE INVENTION

Organizations need to obtain high-quality work product, while being assured that the assets are produced using appropriate quality measures and adhere to desired standards, in an affordable manner. In general, the invention relates to techniques to aid submitters in their submission tasks, and at the same time, to aid reviewers in their formal verification of submissions. In general, in one approach, a screening system is provided that performs automatic checks on submissions. Using the tool, submitters can receive immediate feedback on their submissions, to determine whether any formal requirements have not been met. If given access, submitters may even check their submissions prior to submission, to determine whether there are any errors. Reviewers may use the tool to quickly verify aspects of a submission that can be verified in an automated fashion.

Generally speaking, this goal can be achieved, in one embodiment, by a method for screening submissions in a production contest system. The method includes receiving a production competition submission from a contestant, automatically screening the submission with a screening system upon receipt of the submission to verify that the submission meets predetermined requirements. The method may include providing to the contestant and/or an administrator results of whether the submission meets the predetermined requirements.

Prior to submission, the contestant may be registered for the contest. There may be interaction with the contestants via a discussion board web site. The contestant may be authenticated prior to submission, such as with a username and password, or otherwise. The contestant may be previously ranked or rated.

The predetermined requirements may be any sort of requirements for submission. Typically, the submission requirements that are evaluated by the screening system are formal requirements that are verifiable by an automated tool. For example, the predetermined requirements may require that particular file names, file types, and directory structures be used. The predetermined requirements may address the names and formatting of the content of individual content files. For example, the predetermined requirements may include particular names and subject headings within a document, or a particular structure within a UML document. The predetermined requirements may require an acceptable response from an automated processing tool such as a compiler, pre-processor, style checker, interpreter, parser, and so on. For example, the requirements may include that software code be able to be compiled with a particular compiler with no errors, or that an XML file be able to be parsed with a particular parser. The predetermined requirements may require integration of various elements of the submission. For example, the requirements may include the requirement that if a file name is included, that it be listed on an inventory list, and also be described in a section in the documentation. For each, alone or in combination, the screening system can automatically check for adherence of the submission to the requirements.

In one embodiment, the screening system includes a pluggable framework that allows configuration of the screening system for a particular production competition. This framework, generally, may include a number of validators, that may be added into the screening system. The method also may include configuration data for configuring the screening system for the requirements of a production competition. In addition, the framework, generally, may include configuration data that is used to configure the validators for the requirements of a particular contest.

Validators that are included in the screening system may include, as non-limiting examples, a file type rule validator, a directory validator, a component specification rule validator, a log file rule validator, a UML rule validator, a source code rule validator, a style rule validator, and a personal information rule validator.

For example, the file type validator verifies file types, and the personal information rule validator determines whether a submission contains information identifying the submitter.

The method may include conducting a substantive review of the submission by a reviewer. The reviewer typically will be different than the screener, and not be involved in the screening process. For example, if one of the goals of the review is to have the reviewer not know the identity of the contestant, it may make sense to have a separate screener can verify that there is no identifying information in the submission.

In general, in another aspect, a method for conducting a computer software production contest includes configuring a screening system with information specific to the requirements of a computer software production contest, the screening system for verifying that submissions meet predetermined requirements, communicating to contestants requirements for production of a submission, receiving production competition submissions from some of the contestants, automatically screening the contestants' submissions upon receipt of each submission with the screening system configured with the configuration data to verify that the submissions meet predetermined requirements, and providing to submitting contestants results of whether their respective submissions meet the predetermined requirements.

In general, in another aspect, a production contest system includes a receiver for receiving a production competition submission from a contestant, a screening system for automatically screening the submission upon receipt of the submission to verify that the submission meets predetermined requirements, and a communication subsystem for providing to the contestant results of whether the submission meets the predetermined requirements.

The system may include configuration data for configuring the screening system for the requirements of the production competition, and validators for validating rules according to the configuration data.

In general, in another aspect, the invention relates to a computer program product, such as a computer-readable medium, containing instructions to implement the above.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
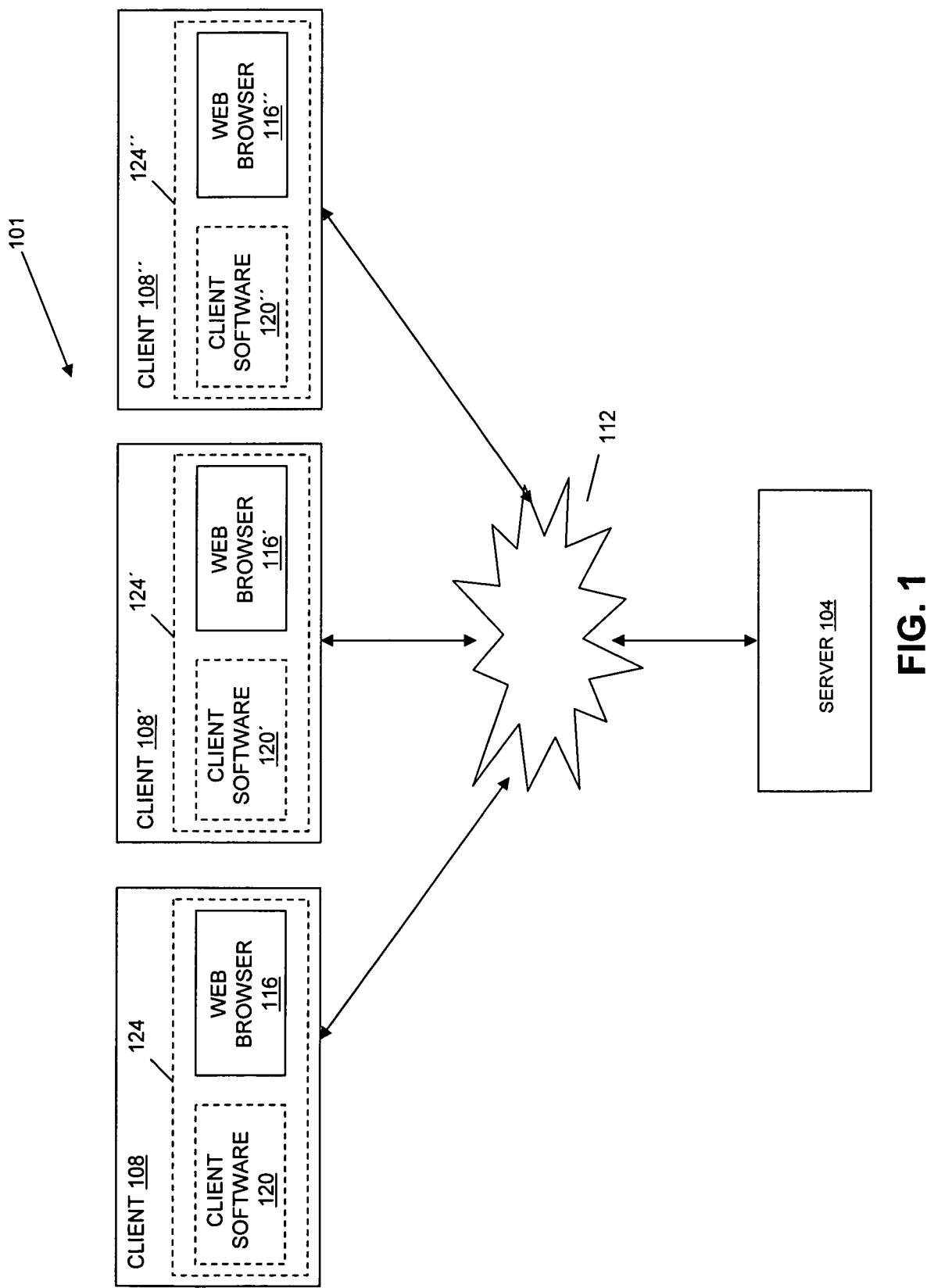
FIG. 1 is a block diagram of an embodiment of a distributed software development system having a server according to the invention.

Referring to FIG. 1, in one embodiment, a distributed work product production system 101 includes at least one server 104, and at least one client 108, 108', 108", generally 108. As shown, production system includes three clients 108, 108', 108", but this is only for exemplary purposes, and it is intended that there can be any number of clients 108. The client 108 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 108 could also be implemented on such hardware as a smart or dumb terminal, network computer, wireless device, wireless telephone, information appliance, workstation, minicomputer, mainframe computer, or other computing device that is operated as a general purpose computer or a special purpose hardware device used solely for serving as a client 108 in the distributed software development system.

Generally, in some embodiments, clients 108 can be operated and used by participants to participate in various production activities. Some examples of production activities include, but are not limited to software development projects, graphical design contests, webpage design contents, document authoring, document design, logo design contest, music and song composition, authoring of articles, architecture design projects, landscape designs, database designs, courseware, software design projects, supporting software programs, assembling software applications, testing software programs, participating in programming contests, as well as others. The techniques may be applied to any work product that may be produced by an individual or team, alone or in conjunction with a machine (preferably a computer) by way of a contest. Clients 108 can also be operated by entities who have requested that the designers and developers develop the assets being designed and/or developed by the designers and developers (e.g., customers). The customers may use the clients 108 to review, for example, software developed by software developers, logos designed by graphic artists, user interface designers, post specifications for the development of software programs, test software modules, view information about the contestants, as well as other activities described herein. The clients 108 may also be operated by a facilitator, acting as an intermediary between customers for the work product and the contestants.

In various embodiments, the client computer 108 includes a web browser 116, client software 120, or both. The web browser 116 allows the client 108 to request a web page or other downloadable program, applet, or document (e.g., from the server 104) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 108 manually requests a web page from the server 104. Alternatively, the client 108 automatically makes requests with the web browser 116. Examples of commercially available web browser software 116 are INTERNET EXPLORER, offered by Microsoft Corporation, NETSCAPE NAVIGATOR, offered by AOL/Time Warner, or FIREFOX offered the Mozilla Foundation.

In some embodiments, the client 108 also includes client software 120. The client software 120 provides functionality to the client 108 that allows a contestant to participate in, supervise, facilitate, or observe production activities described above. The client software 120 may be implemented in various forms, for example, it may be in the form of a Java applet that is downloaded to the client 108 and runs in conjunction with the web browser 116, or the client software 120 may be in the form of a standalone application, implemented in a multi-platform language such as Java or in native processor executable code. In one embodiment, if executing on the client 108, the client software 120 opens a network connection to the server 104 over the communications network 112 and communicates via that connection to the server 104. The client software 120 and the web browser 116 may be part of a single client-server interface 124; for example, the client software can be implemented as a "plug-in" to the web browser 116.

A communications network 112 connects the client 108 with the server 104. The communication may take place via any media such as standard telephone lines, LAN or WAN links (e.g., T1, T3, 56 kb, X.25), broadband connections (ISDN, Frame Relay, ATM), wireless links (802.11, bluetooth, etc.), and so on. Preferably, the network 112 can carry TCP/IP protocol communications, and HTTP/HTTPS requests made by the web browser 116 and the connection between the client software 120 and the server 104 can be communicated over such TCP/IP networks. The type of network is not a limitation, however, and any suitable network may be used. Non-limiting examples of networks that can serve as or be part of the communications network 112 include a wireless or wired Ethernet-based intranet, a local or wide-area network (LAN or WAN), and/or the global communications network known as the Internet, which may accommodate many different communications media and protocols.

The servers 104 interact with clients 108. The server 104 is preferably implemented on one or more server class computers that have sufficient memory, data storage, and processing power and that run a server class operating system (e.g., SUN Solaris, GNU/Linux, and the MICROSOFT WINDOWS family of operating systems). Other types of system hardware and software than that described herein may also be used, depending on the capacity of the device and the number of users and the size of the user base. For example, the server 104 may be or may be part of a logical group of one or more servers such as a server farm or server network. As another example, there could be multiple servers 104 that may be associated or connected with each other, or multiple servers could operate independently, but with shared data. In a further embodiment and as is typical in large-scale systems, application software could be implemented in components, with different components running on different server computers, on the same server, or some combination.

In some embodiments, the server 104 also can include a contest server, such as described in U.S. Pat. Nos. 6,569,012 and 6,761,631, entitled "Systems and Methods for Coding Competitions" and "Apparatus and System for Facilitating Online Coding Competitions" respectively, both by Lydon et al.

In one embodiment, the server 104 and clients 108 may or may not be associated with the entity requesting the production of the work product.

In one embodiment, the work product being produced is an aesthetic design. Generally, an aesthetic design is a representation of a decorative, artistic and/or technical work that is created by the designer. For example, the design can be a graphic design, such as a logo, a graphic, or an illustration. The design can be a purposeful or inventive arrangement of parts or details. For example, the design can be the layout and graphics for a web page, web site, graphical user interface, and the like. The design can be a basic scheme or pattern that affects and controls function or development. For example, the design can be a prototype of a web page or pages, a software program or an application. As another example, the design can be a product (including without limitation any type of product, e.g., consumer product, industrial product, office product, vehicle, etc.) design or prototype. The design also can be a general or detailed plan for construction or manufacture of an object or a building (e.g., an architectural design). For example, the design can be a product design. The design can be the design for a computer program, as described in co-pending U.S. patent application Ser. No. 11/035,783, filed Jan. 14, 2005.

In one embodiment, the design is a logo that an individual, company, or other organization intends to use on its web site, business cards, signage, stationary, and/or marketing collateral and the like. In another embodiment, the design is a web page template, including colors, graphics, and text layout that will appear on various pages within a particular web site.

In one embodiment, the work product is a requirements specification for a software program, including the requirements that the program must meet and can include any sort of instructions for a machine, including, for example, without limitation, a component, a class, a library, an application, an applet, a script, a logic table, a data block, or any combination or collection of one or more of any one or more of these.

In instances where the work product describes (or is) a software program, the software program can be a software component. Generally, a software component is a functional software module that may be a reusable building block of an application. A component can have any function or functionality. Just as a few examples, software components may include, but are not limited to, such components as graphical user interface tools, a small interest calculator, an interface to a database manager, calculations for actuarial tables, a DNA search function, an interface to a manufacturing numerical control machine for the purpose of machining manufactured parts, a public/private key encryption algorithm, and functions for login and communication with a host application (e.g., insurance adjustment and point of sale (POS) product tracking). In some embodiments, components communicate with each other for needed services (e.g., over the communications network 112). A specific example of a component is a JavaBean, which is a component written in the Java programming language. A component can also be written in any other language, including without limitation Visual Basic, C++, Java, and $C^{\#}$.

In one embodiment, the work product is an application that, in some cases, may be comprised of other work product such as software components, web page designs, logos, and text. In one embodiment, the software application is comprised of work product previously produced using the methods described herein. In some embodiments, the application comprises entirely new work product. In some embodiments, the application comprises a combination of new work product and previously produced work product.

Figure 2:
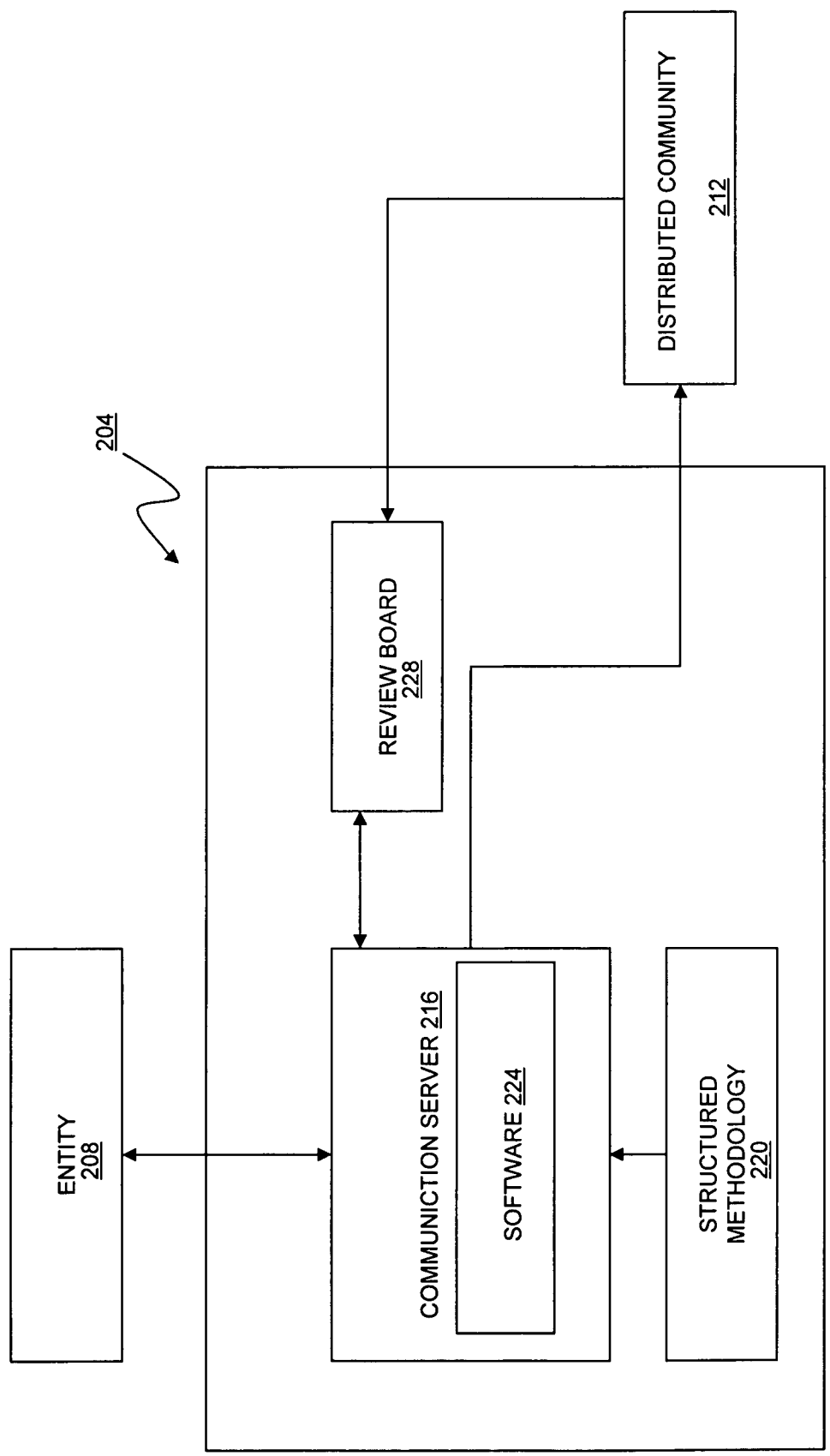
FIG. 2 is a block diagram of one embodiment of a software development domain according to an embodiment of the invention.

Referring to FIG. 2, a production domain 204 can be used to provide an entity 208 with high-quality work product. One or more contestants can be identified and/or selected by various methods from a distributed community 212, and subsequently used to produce the desired work product(s). For example, the members of the community can be employees of, consultants to, or members of an organization, enterprise, or a community fostering collaborative production, and in some cases the members of the community may have no other formal or informal relationship to each other. In some embodiments, one or more of the members of the community can act as a product manager who is responsible for organizing and coordinating the efforts of other members of the community to produce the work product. The product manager may also specify items such as, without limitation, the cost of the project, the project schedule, and the project risks. In one embodiment, the product manager creates a project plan for producing the work product, which may include, without limitation, an estimated project cost and schedule, and a requirements document describing, for example, the scope and risks of the project and the evaluation criteria against which submissions are to be evaluated, etc.

In some embodiments, the members of the community may include architects, graphic artists, designers, programmers, quality assurance engineers, or others with domain experience applicable to the work product, as well as other software development roles as described in co-pending U.S. patent application Ser. No. 10/408,402, entitled "Method and Systems for Software Development" by Hughes.

In one embodiment, the production domain 204 includes a communication server 216, one or more structured methodologies 220, production software 224, and a review board 228. The communication server provides a conduit through which the external entity 208, the members of the community 212, and the review board 228 can interact, for example, to provide work product to elicit and offer feedback, review submitted work product, and potentially rate submitted work product, either in design or functional form. In some embodiments, the communication server is or operates as part of the server 104 as described above, whereas in other cases the communication server may be a separate server, which may be operated by and/or outsourced to an application service provider (ASP), internet service provider (ISP), or other third-party.

In one embodiment in which the contest relates to software development, the structured methodology 220 provides a framework for the development of software programs. The methodology 220 specifies a common vocabulary, a fixed set of deliverables, development phases or steps, inputs and outputs for one or more of the steps, as well as other aspects of the development process. For example, the methodology 220 bifurcates the development process into an architecture and design phase and a development and testing phase. Furthermore, in this particular non-limiting example, the outputs of the architecture and design phase, such as class diagrams, test cases, technical specifications, and other design documents, are submitted, reviewed, and finalized prior to initiating any development work. Once a set of design documents are selected and approved, the design documents are used as input into the development phase. During the development and testing phase, the developer(s) create source code, scripts, documentation, and other deliverables based on the design documents. By assuring the high-quality of the design documents prior to beginning development, the developers are afforded a complete and accurate representation of what it is they are being asked to develop. Furthermore, by using a structured methodology, the participants, (e.g., developers 212, the entity 208) can communicate effectively, and the outputs of each process step are known and can be verified. By providing a common definition, and a known set of inputs, such as use cases, and a known set of outputs such as expected results, and facilitating community-based development, the developers can interact with each other effectively and efficiently, thus reducing the cost and time necessary to produce quality software.

The software 224 provides an operational mechanism for implementing the methodology 220, and a production environment in which the developers can do one or more of develop, test, submit, and verify their work product. In some embodiments, as shown, components of the software 224 may reside on the server 104, whereas some components may be included in client software residing on a client, e.g., as described above. The software 224 optionally can include one or more modules such as a development library, from which developers can access previously developed components, work product and documentation templates; a documentation feature that provides information about terms, syntax, and functions; a compiler that also allows a developer to identify and correct programming errors; and even version control and code management functions.

Figure 3:
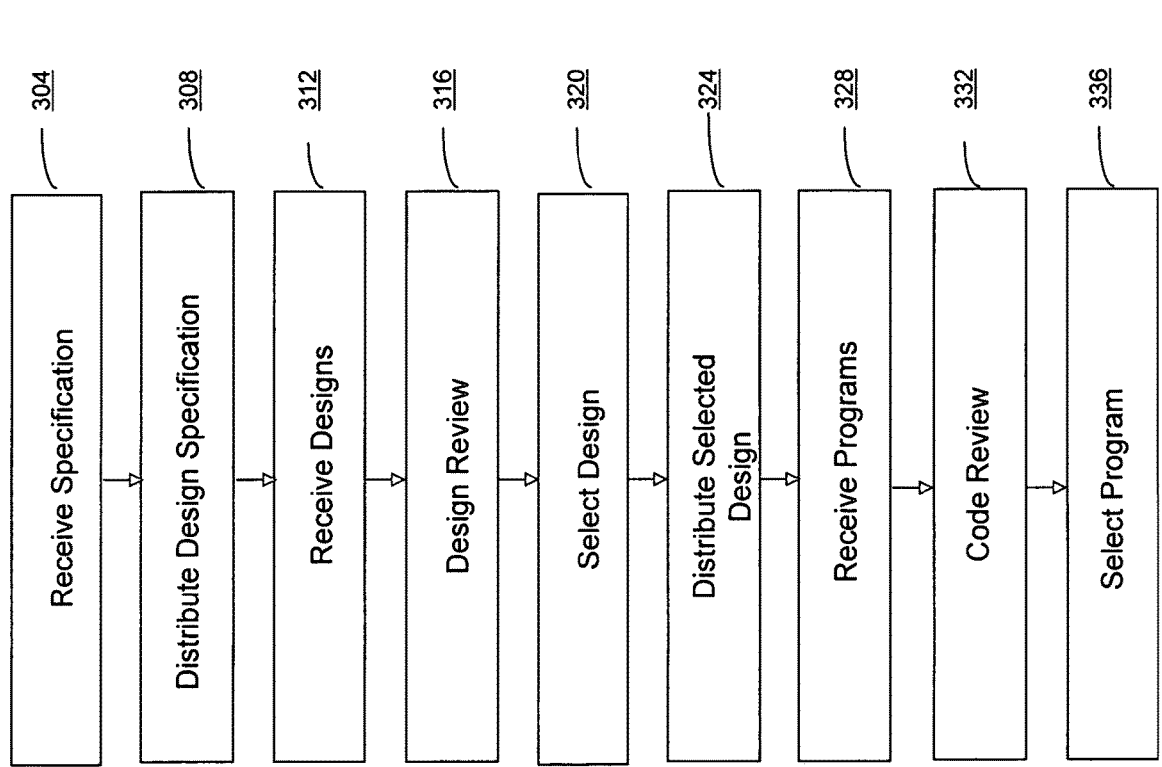
FIG. 3 is a flow chart depicting steps performed in developing a software program according to an embodiment of the invention.

FIG. 3 provides a summary illustration of one embodiment of a method for developing software, as one example, using the production domain 204 described above. The communication server 216 receives a specification (STEP 304) describing the desired functions of a software program, which is then distributed to the distributed community of programmers 212 (STEP 308). One or more of the members of the community 212 creates a design detailing the technical aspects of the program based on the functionality described in the specification, and once completed, the design(s) are received at the server 104 (STEP 312). The submitted design(s) are then subject to a design review process (STEP 316) whereby the design(s) are compared to the specification, and evaluated on their implementation of the specified functionality and compliance with the structured methodology 220. A design that is the "best" of the submissions may be selected in response to the evaluations (STEP 320), and if there is at least one submission of sufficient quality, the selected design may be made available to the members of the community 212 (STEP 324). Each of a number of programmers (or, in some cases, each of teams of programmers) submits a software program that they believe conforms to the design and the requirements of the structured methodology 220. The software programs are received at the server 104 (STEP 328) and the programs are subjected to a software review process (STEP 332) to determine which submitted program(s) best conform to the distributed design and the structured development methodology 220. Once reviewed, one (or in some cases more than one, or none if none are of sufficient quality) program is identified as a "winning" submission (STEP 336).

Figure 4:
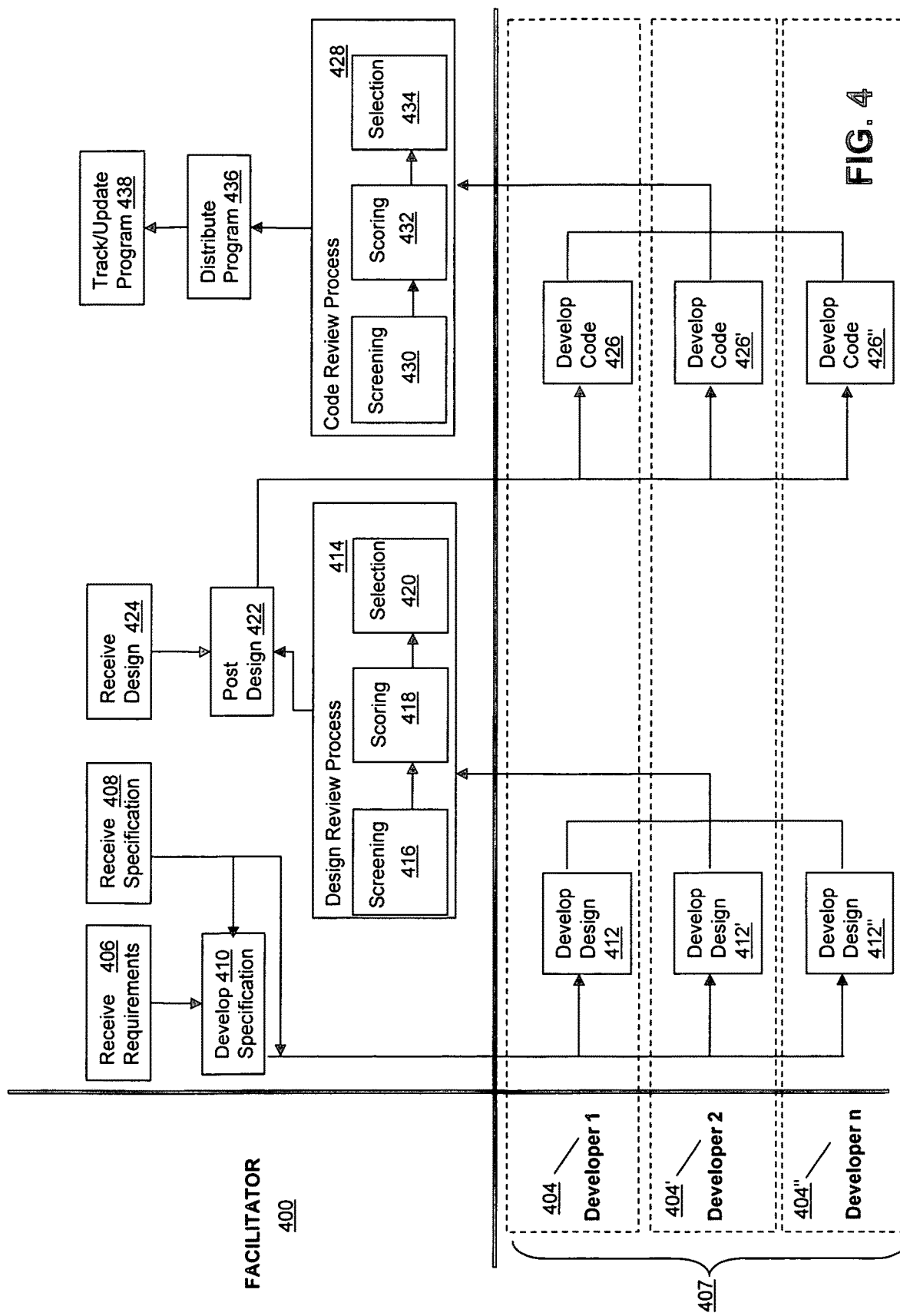
FIG. 4 is a flow chart depicting an overview of the operation of an embodiment of the invention.

FIG. 4 provides one possible implementation of the general method described above. In some such embodiments, the development process is monitored and managed by a facilitator 400. The facilitator 400 can be any individual, group, or entity capable of performing the functions described here. In some cases, the facilitator 400 can be selected from the members of the community 212 based on, for example, achieving exemplary scores on previously submitted work product, or achieving a high ranking in a skill or production contest. In other cases, the facilitator 400 can be appointed or supplied by the entity (e.g., entity 208) requesting the development of the software program, for example, and thus oversee the production process for further assurance that the end product will comport with the specifications.

Initially, the facilitator 400 receives input from an entity (not shown) wishing to have an asset developed on their behalf. In the case of a software program, the entity can be a company looking to have one or more computer programs designed and/or developed for internal use, or as portions of larger applications that they intend to sell commercially. In some cases, the entity provides a detailed specification, and in other cases only a list of functional requirements may be provided. The facilitator receives either the requirements (STEP 406), the specification (STEP 408), or in some cases both from the external entity. If, however, no specification is provided, or of the specification needs revisions to conform to the methodology, the facilitator can develop a specification in accordance with the requirements (STEP 410). In some cases, one or more members of the development community 407 (e.g., production community 212 in FIG. 2) may be asked to develop the specification, and in some cases multiple specifications may be submitted, with one of the submissions selected as the final specification to be used for guiding the design and development efforts.

In one embodiment, the specification defines the business plan and a stable hardware and/or software platform, or other architectural, environmental, or artistic constraints. For example, in the software development context, the specification can define the network devices, servers, and general infrastructure to support the development and production of the project and product. The specification can also identify a language or tools that the component must be programmed in or with, a functional overview of the software component, boundary conditions, efficiency requirements, computer platform/environment requirements, interface requirements, performance criteria, test-case requirements, and/or documentation requirements of the component. In some embodiments, the specification can include an amount of money that will be paid to the designer who submits the best design and/or program that complies with the specification.

In some cases, the specification is assigned a difficulty level, or some similar indication of how difficult the facilitator, entity, or other evaluator of the specification, believes it will be to produce a comprehensive design according to the specification. The difficulty level may, in some cases, also be based on the effort believed to be necessary to complete the task, and the time allotted to complete the task. The difficulty level may be expressed in any suitable manner, for example as a numerical measure (e.g., a scale of 1 to 10), a letter grade, or a descriptive such as easy, medium, or hard. For example, a specification for the design of a complex gene-sequencing algorithm may have a difficulty level of 9 on a scale of 1 to 10, whereas a simple component that performs a search for specific text in a file may be assigned a difficulty level of 2. If there are additional practical constraints, for example if the search component is needed in two days, the difficulty level optionally may be increased due to the tight time constraints. In some embodiments, an award to the designer (e.g., money, skill rating, etc.) that submits the selected design may be produced or adjusted based in part on the difficulty level associated with the specification.

Once the specification is received (or developed), the facilitator 400 (or in some cases a project manager) reviews the specification to determine if it meets the requirements for a complete specification according to the methodology 220. The methodology can include best-practice activities, templates, guidelines, and standards that assist software architects, programmers, and developers in producing quality code in a consistent and efficient manner. The use of such a methodology reduces the need to rethink and recreate programming documentation and constructs, thus reducing project duration, cost, and increasing quality and component reusability.

Once complete, the specification is distributed via the communications server 212 to one or more developers 404, 404', 404'' (generally, 404), who may be members, for example, of a distributed community of programmers such as the community 212 shown in FIG. 2. In one non-limiting example, the developers 404 are unrelated to each other. For example, the developers may have no common employer, may be geographically dispersed throughout the world, and in some cases have not previously interacted with each other. However, as members of the community 212, the developers 404 may have participated in one or more competitions, and/or have had previously submitted software artifacts subject to reviews. This approach allows an entity 208 to gain access to a large pool of qualified software developers.

The communication can occur over a communications network such as the network 112 (FIG. 1), such as via an email, instant message, text message, a posting on a web page accessible by the web browser 116, through a news group, facsimile, or any other suitable communication. In some embodiments, the communication of the specification can be accompanied by an indication of a prize, payment, or other recognition that is available to the designer(s) that submit selected software design(s). In some cases, the amount and/or type of payment may change over time, or as the number of participants increases or decreases, or both. In some cases multiple designers may be rewarded with different amounts, for example a larger reward for the best design, and a smaller reward for second place. The number of designers receiving an award can be based on, for example, the number of designers participating in the design project, or other similar attributes.

The recipients of the specification can be selected by various means. In some embodiments, members of the community may have expressed interest in participating in a development project, whereas in some cases the individuals are selected based on previous performances in coding competitions, prior development projects, or other methods of measuring the programming skill of a software developer. For example, the members of the distributed community of programmers may be programmers who have previously participated in an on-line programming competition. In such a case, the programming skills of the participants may have been rated according to their performance, either individually, as a team, or in relation to other programmers, and the ratings may be used to determine which programmers are eligible to receive notification of a new specification or respond to a notification.

In one embodiment, the facilitator 400 moderates a collaborative forum among the various participants (the external entity 208, the developers 404, etc.) to determine, discuss, or collaborate on design features. The collaborative forum can consist of developers, customers, prospective customers, or others interested in the development of certain software. In one embodiment, the collaboration forum is an online forum where participants can post ideas, questions, suggestions, or other information. In some embodiments, only a subset of the forum members can post suggestions to the forum.

Upon receipt of the specification, one or more developers 404 each develop software designs (STEPS 412, 412' and 412") in accordance with the specification. The development of the software design can be done using any suitable development system, for example, the software development software 224 provided via the communication server 216, a development environment provided by the developer 404, or some combination thereof. Once a developer 404 is satisfied that her design meets the specified requirements, and follows the structured development methodology 220, she submits her design e.g., via the communications server 216, facsimile, email, mail, or other similar methods.

To determine which design will be used as the design for the software program, a design review process (STEP 414) is used. This design review can take place in any number of ways. In some cases, the facilitator 400 can delegate the review process to one or more members of the distributed community of programmers, or an appointee of the entity. The design review process, in some embodiments, includes one or more developers 404 acting as a design review board to review design submissions from software designers. The design review board preferably has a small number of (e.g., less than ten) members, for example, three members, but can be any number. Generally, the review board is formed for only one or a small number of related projects, for example three projects. Review boards, in some embodiments, could be formed for an extended time, but changes in staffing also can help maintain quality.

Preferably, one member of the design review board members is selected as the primary review board member by the facilitator 400 and/or the project manager, the members of the review board, and/or the external entity requesting the software program. In some cases, the facilitator 400 or a representative of the facilitator 400 acts as the primary review board member. The primary review board member is responsible for coordination and management of the activities of the board.

In one embodiment, submissions for software designs are judged by the design review board. In some embodiments, the primary review board member screens the design submissions before they are reviewed by the other members of the design review board, to allow the rest of the review board to judge only the best of the submissions. In some embodiments, the screening process includes scoring the submissions based on the degree to which they meet formal requirements outlined in the specification (e.g., format and elements submitted). In some embodiments, scores are documented using a scorecard, which can be a document, spreadsheet, online form, database, or other electronic document. The design review board may also, in some cases, verify the anonymity of the developers 404 such that their identities cannot be discerned from their submissions.

A screening review can determine whether the required elements of the design are included (e.g., class, use-case, and sequence diagrams, component specification, required algorithms, class stubs, and functional tests). The screening review can also determine that these elements appear complete. With regard to the class diagram, for example, and in particular the class definition, the screening review can determine any or all of that: (1) the class definition provides a descriptive overview of the class usage, (2) sub-packages have been created to separate functionality, (3) class scope matches class usage, (4) there is proper and effective use of programming techniques such as inheritance and abstraction, (5) interfaces are used properly, (6) suitable constructors are defined for the component, and that (7) class modifiers such as final and static, are appropriately used. The screening review can also determine, for example, with regard to variable definitions, that: (1) variable scope is correctly defined, (2) type assignments are defined appropriately for balance between efficiency and flexibility, and (3) that all variables are defined with an initial value. Further, with regard to method definitions, for example, the screening review can determine that: (1) scope is correctly defined, (2) exceptions are handled and used appropriately, (3) modifiers are properly used, (4) return types are used, (5) method arguments are properly defined, and (6) that the application programming interface (API) as stated in the requirements specification is available.

The screening review can also, for example, verify that use-case diagrams exist for all public methods in the design, and that sequence diagrams exist for each use case. The screening review can also, for example, with regard to test cases, verify that functional test cases are provided for each sequence diagram, and that they appear to be appropriate for those diagrams. The designs can take a number of forms, depending on the program specified. Typically, the specifications will include the requirements for the design. In one embodiment, the design requirements include class diagrams, which can be developed in a modeling language, such as the Unified Modeling Language (UML), for example using the Poseideon Computer Aided Software Engineering (CASE) tool, available from Gentleware AG of Hamburg, Germany, or Domain-Specific Language (DSL) tools, and so on. The design requirements also include use-case diagrams and sequence diagrams. The design requirements also include a written component design specification describing the design, a list of required algorithms, and class stubs for the classes in the design. The design requirements also include functional tests that can be used to test the program. In one such embodiment, the functional tests are tests compatible with the JUnit testing infrastructure. JUnit is open source software for testing Java software, which is available from www.sourceforge.net.

In one embodiment, the primary review board member informs the design review board that one or more submissions have passed the initial screening process (STEP 416), and the design review board then evaluates the design submissions in greater detail. In some embodiments, the design review board reviews the submissions based on requirements documented in the specification. In some embodiments, the design review board scores the submissions (STEP 418). In some embodiments, the scores are documented using a scorecard, which can be any form, including a document, spreadsheet, online form, database, or other electronic document.

In some embodiments, the scores and reviews from the primary review board member and the other members of the design review board are aggregated into a final review and score. In some embodiments, the aggregation can comprise compiling information contained in one or more documents. Such aggregation can be performed by the primary review board member, the other members of the design review board, or in one exemplary embodiment, the aggregation is performed using a computer-based system which resides on the server 104 (FIG. 1). In some embodiments, the facilitator 400 or the primary review board member resolves discrepancies or disagreements among the members of the design review board.

In one embodiment, the design with the highest combined score is selected as the winning design that will be used for implementation (STEP 420). A prize, payment and/or recognition is given to the designer. In one embodiment, a portion of the payment to the designer is withheld until the end of the development review. For example, the designer may receive 75% of the payment at the end of the design review, and 25% is paid after the code review. There can also be prizes, payments, and/or recognition for the other submitted designs. For example, the designers that submit the second and third best designs may also receive payment, which in some cases may be less than that of the winning designer. Payments may also be made for creative use of technology, submitting a unique test case, or other such submissions. In some embodiments, the software developers can contest the score assigned to their design, program, or other submissions.

In some cases, the posted design is assigned a difficulty level, or some similar indication of how difficult the external entity, facilitator 400 or some evaluator of the design believes it will be to produce a software program or component that meets the requirements of the selected design. Like the difficulty levels assigned to the specification, the difficulty level assigned to a design may, in some cases, also factor in the effort believed to be necessary to complete the task, and the time allotted to complete the task. In some embodiments, the recognition awarded to the designer (e.g., money, skill rating, etc.) that submits the selected design may be adjusted based in part on the difficulty level associated with the specification.

In some embodiments, in addition to reviewing the submissions, the design review board can identify useful modifications to the design that should be included into the design prior to entering the development phase. The primary review board member documents the additional requirements, and communicates this information to the designer 404 who submitted the design. In one embodiment, the primary review board member aggregates the comments from the review board. The developer 404 can update the design and resubmit it for review by the design review board. This process can repeat until the primary review board member believes the design has met all the necessary requirements.

Once the design review board validates that a design has sufficiently addressed the requirements of the specification, the primary review board member notifies the facilitator 400, product manager, or external entity that such a design has passed the design review process. The design can then be posted and/or distributed (STEP 422) to the community of developers 407 to solicit submissions for software programs that conform to the design. For example, the facilitator 400 can make the design available on a web site and/or a mailing list for implementation, and request components according to the design.

In one alternative embodiment, and as an example of the flexibility of the system, the entity develops the software design and provides the design to the facilitator 400 as input directly into the development process. The facilitator 400 receives the design (STEP 424) and optionally initiates a review process as described above to confirm that the design meets the standards of the structured development methodology 220. Using this approach, an entity wishing to maintain control of the design phase of the software development process (e.g., architecture, platform, coding standards, etc.) can utilize internal or other resources such as business and systems analysts to develop a design that complies with their standards, and then utilize a distributed community of developers 212 to develop the end product. Generally, this alternative maintains the design aspects of the software development process in-house, and "outsources" the manufacturing aspects of the development process such that the development domain 204 can use repeatable, structured development methods and the community of developers 212 to develop the software programs. Similarly, the entity 208 may only require the services of the development domain 204 to develop a software design, and subsequently use other resources such as in house programmers or off shore developers to develop the code.

The flexibility provided by maintaining multiple entry and exit points into and out of the development process allows external entities to decide, on a case by case or phase by phase basis whether to utilize the development domain 204 from start to finish, (i.e., specification through testing and support) or only use the domain 204 for specific phases of the process (i.e., development of code, development of a specification, development of a software design, testing, support, etc.).

In cases where the desired asset to be developed is a design (e.g., a logo, graphic design, etc.) the design with the highest score from the design review process is identified as the winning design and provided to the entity as a completed design. A number of designs also may be used as a starting point for another design contest, for iterative production.

If, as in some cases, the winning design is a design for a software component, the design can be used as input into a development contest. Referring still to FIG. 4, the selected and approved design is posted or provided to members of the members of the community 212. As above, with the specification, the design may be sent to the entire community or only selected members of the community. In versions where the design is sent to selected members, the selection process can be based on any or a combination of suitable criteria, for example, without limitation, past performances in programming competitions, the quality of previously submitted software programs, involvement in the development of the design, or by specific request of the facilitator 400, entity 208, the designer that submitted the winning design, other designers, or other members of the community 212. In some embodiments, the communication of the design can be accompanied by an indication of a prize, payment, or other recognition that is available to the developer that submits a selected software program, and/or runners up. In some cases, the amount and/or type of payment may change over time, or as the number of participants increases or decreases.

Each developer 404 develops software code (STEPS 426, 426', and 426") meeting the requirements of the selected design, and when completed, submits the code for example to the facilitator 400 or the server. As described above, the developers 404 may use a variety of coding techniques, languages, and development environments to develop the software, so long as the code meets, for example, the functional and architectural aspects dictated by the design and the quality and syntactical standards outlined by the structured development methodology 220. In some embodiments, the developers 404 may use the software development software 224 provided via the communication server 216 to assist with the development tasks. Because the development software 224 and development methodology 220 are both maintained within the development domain 204, many of the coding and quality control requirements of the methodology 220 can be built into the software 224, further assisting the developers 404 to develop quality code in an efficient manner.

To determine which software program will ultimately be selected as the program to be delivered to the entity 208, a code review process (STEP 428) is used, which can take place in any suitable manner. The code review process, in some embodiments, includes one or more developers 404 acting as a code review board to review submitted software programs from software developers. The code review board preferably has a small number of members (e.g., less than ten), for example, three members, but can be any number. Generally, the code review board is formed for only one or a small number of related projects, for example three projects, and then disbanded to allow the members to participate in additional design review boards, code review boards, or participate as designers and/or developers themselves. Review boards, in some embodiments, could be formed for an extended time, but changes in staffing also can help maintain quality.

Preferably, one member of the code review board members is selected as the primary code reviewer by the facilitator 404 and/or the project manager, the members of the review board, and/or the external entity requesting the software program. In some cases, the facilitator 400 or a representative of the facilitator 400 acts as the primary code board member. The primary code board member is responsible for coordination and management of the activities of the board.

In one embodiment, submissions of software programs are judged by the code review board. In some embodiments, the primary review board member screens the code submissions before they are reviewed by the other members of the code review board, to allow the rest of the code board to judge only the best of the submissions, for example, those that meet minimal requirements. In some embodiments, the screening process includes scoring the submissions based on the degree to which they meet formal requirements outlined in the selected design (e.g., format and elements submitted). In some embodiments, scores are documented using a scorecard, which can be a document, spreadsheet, online form, database, or other electronic document.

In one embodiment, for example, with regard to software code, the code reviewer scores the code based on the extent to which: (1) the submitted code addresses the functionality as detailed in component design documents; (2) the submitted code correctly uses all required technologies (e.g. language, required components, etc.) and packages; (3) the submitted code properly implements required algorithms; (4) the submitted code has correctly implemented (and not modified) the public application programming interface (API) as defined in the design, with no additional public classes, methods, or variables.

With regard to the source code, for example, the screening review can determine any or all of that: (1) all public methods are clearly commented; (2) required tags such as "@author," "@param," "@return," "@throws," and "@version" are included; (3) the copyright tag is populated; (4) the source code follows standard coding conventions for the Java language such as those published by Sun Microsystems; (5) a 4 space indentation is used in lieu of a tab indentation; and (6) all class, method and variable definitions found in the class diagram are accurately represented in the source code. The code review can also, for example, verify that unit test cases exist for all public methods in the design, and each unit test is properly identified by a testing program.

With regard to class definitions, for example, the reviewer can evaluate the code based on the extent to which classes are implemented as defined in design documents (including, for example, modifiers, types, and naming conventions), and whether defined classes are implemented. With regard to variable definitions and method definitions, for example, the reviewer can determine the extent to which all variables and methods are implemented as defined in the design documents (including, for example, modifiers, types, and naming conventions). With regard to relationships, for example, the reviewer can determine the extent to which the implementation properly maps class relationships.

The reviewer can further evaluate code based on a code inspection. For example, the reviewer can determine the extent to which the object types defined in the code are the best choices for the intended usage—for example whether a Vector type should have been used instead of an Array type. The reviewer can determine the extent to which there are any needless loops, or careless object instantiation or variable assignment.

The review can also inspect the test cases. With regard to test cases, for example, the reviewer can determine the extent to which (1) the unit test cases thoroughly test all methods and constructors; (2) the unit test cases properly make use of setup and teardown methods to configure the test environment; (3) files used in unit test cases exist in the designated directory; (4) unit test cases do not leave temporary files on the file system after testing is complete.

The reviewer can run tests on the code using test cases, for example test cases developed by the developer 404, other developers, the reviewers, the facilitator 400, the entity 208, as well as others. The reviewer can even further score the code by conducting accuracy, failure, and stress tests. Accuracy tests test the accuracy of the resulting output when provided valid input. Accuracy tests can also validate configuration data. Failure tests test for correct failure behavior when the component is provided with invalid input, such as bad data and incorrect usage. Stress tests test the component capacity for high-volume operation, but testing such characteristics as performance as throughput. The tests that fail are included in the evaluation of the component, for example as a score reduction. The reviewer can then assign an overall score to the component based on this evaluation.

In one embodiment, the primary review board member informs the code review board that one or more submissions have passed the initial screening step (STEP 430), and the code review board can then evaluate the program submissions in greater detail. In some embodiments, the code review board can review the submissions based on design requirements documented in the selected design. The code review board can then score the submissions (STEP 432) based on the results of the evaluations. In some embodiments, the scores are documented using a scorecard, which can be any suitable means, such as a document, spreadsheet, online form, database, or other electronic document.

In some embodiments, the scores and reviews from the primary code board member and the other members of the code review board are aggregated into a final review and score. In some embodiments, aggregation can comprise compiling information contained in one or more documents. Such aggregation can be performed by the facilitator 400, the primary code board member, the other members of the code review board or in one exemplary embodiment, the aggregation is performed using a computer-based system which resides on the server 104 (FIG. 1). In some embodiments, the facilitator 400 or the primary review board member resolves discrepancies or disagreements among the members of the code review board.

In one embodiment, the software program with the highest combined score is selected as the winning program (STEP 434) that will be delivered to the external entity 208 as a finished product (STEP 436). In some embodiments, a prize, payment and/or recognition is given to the software developer that submitted the winning program. There can also be prizes, payments, and/or recognition for the other submitted programs, as described in greater detail below. For example, the programmers that submit the second and third best programs may also receive payment, which in some cases may be less than that of the winning programmer. Payments may also be made for creative use of technology, submitting a unique test case, or other such submissions. In some embodiments, the software developers can contest the score assigned to their programs, test cases, or other submissions.

In some embodiments, in addition to reviewing the submissions, the code review board can identify useful modifications to the program that should be included into a selected software program prior to distribution. The primary code review board member documents the additional requirements, and communicates this information to the developer 404 who submitted the code. In one embodiment, the primary code review board member aggregates the comments from the review board. The developer 404 can update the program and resubmit it for review by the code review board. This process can repeat until the primary review board member believes the program has met all the necessary requirements and meets the standards specified in the structured development methodology 220.

In some embodiments, the software may be updated with enhancements, post-delivery bug fixes, additional functionality, or modified to operate in additional computing environments or platforms after it has been delivered to one or more entity 208. In such cases, the domain 204 provides for the tracking and updating (STEP 438) of previously distributed software products, as described in co-pending U.S. patent application Ser. No. 10/408,402, entitled "Method and Systems for Software Development" by Hughes, filed on Apr. 7, 2003, and incorporated by reference in its entirety herein.

For example, in one embodiment, an entity commissions the development of a software component, and upon completion of the component, version 1 of the component is distributed to the entity 208. Subsequently, a second entity 208 requests the development of a similar component that performs the same functionality, however to meet the specific request of the second entity, some modifications are made to the component. A modification is, for example, an improvement (e.g., efficiency increase, smaller memory requirements), deletion (e.g., of an unneeded step or feature), and an addition (e.g., of a complimentary feature or function) to the component. Another example of a modification is the integration of the component into another component (e.g., a larger component). In response to the request for the modified component, a new version of the component (version 1.1, for example) is developed and distributed to the second entity 208. In one embodiment, a message is sent to the first entity 208 stating that an updated version of the component is available. In further embodiments, the costs for developing the newer version of the component can be shared among the recipients of the original component (version 1) who wish to receive the new version, as well as the entity that initiated the development of the new version. Additionally, in some embodiments the entity 208 that requested the development of the new version is compensated for licenses/sales of copies of the second version of the component.

As mentioned above, in some embodiments, the developers 404 submit one or more test cases in addition to submitting the completed software program. The purpose of the test cases is to provide sample data and expected outputs against which the program can run, and the actual output of which can be compared to the expected outputs. By submitting multiple test cases, many different scenarios can be tested in isolation, therefore specific processing errors or omissions can be identified. For example, a program that calculates amortization tables for loans may require input data such as an interest rate, a principal amount, a payment horizon, and a payment frequency. Each data element may need to be checked such that null sets, zeros, negative numbers, decimals, special characters, etc. are all accounted for and the appropriate error checking and messages are invoked. In addition, the mathematical calculations should be verified and extreme input values such as long payment periods, daily payments, very large or very small principal amounts, and fractional interest rates should also be verified. In some versions, one test case can be developed to check each of these cases, however in other versions, it may be beneficial to provide individual test cases for each type of error. In certain embodiments, the multiple test cases can then be incorporated into a larger test program (e.g., a script, shell, or other high level program) and run concurrently or simultaneously.

In general, developers are encouraged to develop test cases as they are coding so that they can consider the bounding and error conditions as they code. It can be beneficial to use the test cases developed by one or more, or all, of the other submitters to test each of the submitted programs to cover as many error conditions as possible.

Figure 5:
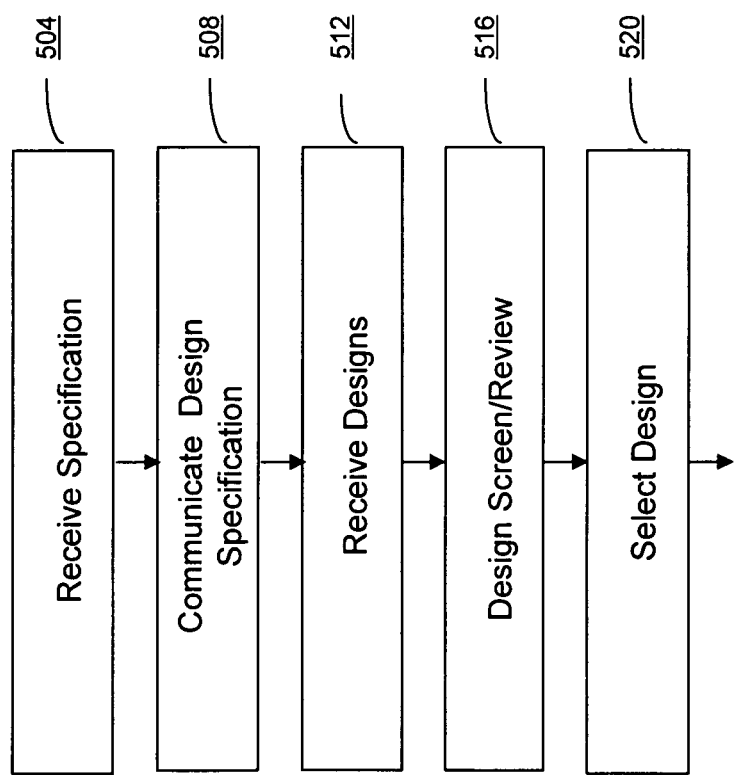
FIG. 5 is a flow chart depicting steps performed in producing a design according to an embodiment of the invention.

FIG. 5 provides a summary illustration of one embodiment of a method for developing a design, for example, using the domain described above. The communication server receives a specification (STEP 504) describing the desired design. The specification can include such information as the type of design, the size of the design, the size and color requirements, desired or undesired themes for the design, background information for creating the design, acceptable files types and formats for the submission, required documentation, and the like. The specification is then communicated to the distributed community of designers (STEP 508). The specification can be communicated by posting to a web site that is accessed by members of the distributed community of designers. The specification can be communicated via email, instant message (IM), or through any other suitable communication technique. The specification can also include any timing deadlines for response, and the prize to be paid for one or more selected (e.g., winning) design(s). For example, prizes can be awarded for first, second, and third place, and the prizes described in the specification.

One or more of the design developers in the community creates a design in response to the requirements described in the specification. Once completed, the design(s) are communicated to, and received at the server (STEP 512). The submitted design(s) are then subject to a design screening and review process (STEP 516). In one embodiment, the submissions are screened for formal requirements. In one embodiment, one or more reviewers (e.g., skilled, experienced and/or highly rated experts, focus groups, a customer, etc.) compare the design(s) to the specification, and evaluate the submissions on their implementation of the requirements (e.g., compliance with the methodology) and the overall aesthetic nature of the design.

In one embodiment, one or more designs that are the "best" of the submissions are selected in response to the evaluations (STEP 520).

Figure 6:
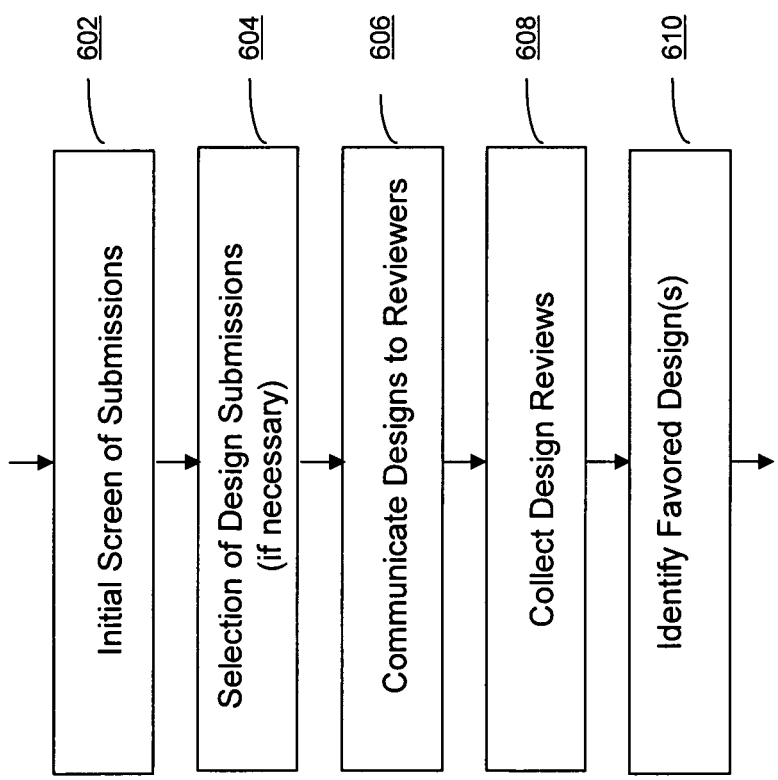
FIG. 6 is a flow chart depicting steps performed in producing a design according to an embodiment of the invention.

Referring to FIG. 6, in one embodiment, a screener, who may or may not be a member of the review board, performs the screening of the designs as described above (STEP 602) to eliminate as a candidate design any design that does not meet the requirements. If the design does not meet the requirements, the screener may inform the designer and allow resubmission, depending on the selection rules.

The design review board, which may be one (e.g., the one screener) or a group of people, selects a number of the submitted designs that meet the requirements, for review by a large number of reviewers (STEP 604). If there are an appropriate number of submissions, there may be no need for any further review. But, if there are a large number of submissions, the number of submissions may be reduced to a smaller number. One goal of such reduction may be to facilitate selection by a larger group, by narrowing the candidate field. Another goal of the reduction may be to select the candidates that are viewed most favorably by the members design review board. The design review board can include, for example, the screener, the facilitator, representatives of the entity that requested the design, customers of the entity that requested the design, focus groups comprised of members of the public (or the potential audience for the design), and so on. Once this selection of candidate design submissions has taken place, then reviewers can be presented with the candidates for evaluation.

For example, in one exemplary embodiment, after screening, there are 25 design submissions that meet the criteria of the requirements. The design review board decides that because of the nature of the design, it would be best to provide reviewers with 10 candidates from which to choose. The design review board selects the 10 designs that the members believe to be the best candidates. In another context, the reviewers might present all 25 to the larger group of reviewers. There may even be situations where many more candidates are presented to the larger group. In general, however, a goal is to provide the review group with a smaller number of choices, so as to reduce the time and effort needed by each member of the larger group of reviewers.

The number of designs selected can be any number that is suitable for selection by a larger group. For example, in one embodiment, designs are eliminated until 10 designs are left. In another embodiment, designs are eliminated until 20 designs are left. This additional selection of designs that meet the requirements may only be necessary if there are a large number of designs submitted. The designs may be evaluated for such exemplary factors as appearance, presentation of desired themes, color selection, and the like. The design review board can "cull" designs that the design review board members do not perceive as favorable to a set that they would find acceptable.

Depending on the number of members of the design review board, there are different techniques that can be used to select the candidates. In one embodiment, the system facilitates the review by the design review board members by presenting the choices to the members, with a mechanism to provide feedback. The feedback can be a simple indication of the preference of each (e.g., yes/no, or number evaluation) or a ranking (e.g., assigning an order of preference) to each. Any suitable technique can be used to solicit and aggregate response indicia from the design review board members. In one embodiment, each design review board member gets one or more "veto" votes to eliminate a candidate that he doesn't like.

The design review board can interact with the communication server, for example, using client software, to review the submissions and select the submissions that should be provided to the reviewing community.

In one embodiment, the design review board also considers a review of the design from the perspective of authorship and intellectual property issues. For example, the design review board can consider how similar the design submissions are to designs offered by competitors or others, to further a potential goal that the design, if selected, will not raise concerns from third-parties. The design review board may also consider the protectability of the design, with regard to copyright and trademark law. This may involve legal review, or other techniques to eliminate potential problems that may be raised by the set of candidates. Although potentially more time consuming to consider a number of candidates at this stage, rather than once a single choice is selected, it may be preferable to do so in some situations.

Once the candidate set is identified, the design review board can then consider the opinions of a larger group to determine select one or more "best" designs. The system solicits review of the selected submissions from a larger group of reviewers (STEP 606). The larger group of reviewers may be the intended audience for the design, for example, customers and potential partners of the company whose logo is being designed. The larger group of reviewers may be, in the case of a web page interface, for example, potential users of the web page. The larger group of reviewers may include other design developers, members of the requesting entity (e.g., employees of the company such as sales and marketing personnel), or any other suitable group or combination of groups of people. In one embodiment, the reviewers include people who are not affiliated with the entity, but who have agreed provide their opinion about the design. The demographics (e.g., where they live, what language(s) do they speak, their ages, incomes, etc.) of the larger group of reviewers may be important considerations in selecting the larger group.

The larger group of reviewers may be compensated in some way for their participation. For example, the reviewers may be provided with monetary or other rewards or prizes, or the opportunity to participate in a lottery for such reward. Participation in one or more larger groups of reviewers may be a requirement for submission of a design. For example, in one embodiment, a design developer needs to participate in a predetermined number of larger group reviews during a predetermined time period (e.g., week, month, calendar quarter) to have an ability to submit designs.

The larger group reviewers may be ranked and/or rated, for example based on how reliable they are, how quickly they respond, and/or how well their selections comport with the selection of the larger group(s) in the review(s) that they participate in.

In one embodiment, the larger group of reviewers is invited by email to review the designs. Each of the larger group of reviewers receives an email message directing them to a web page that includes the list of candidate designs. In the case of a logo, the candidates are displayed on the page, with any additional information needed for review, as well as a selection tool for assigning response indicia. For example, if there are ten candidate designs, each design can be assigned a response indicia from 1 to 10, and the reviewer is asked to assign a number to each design in order of the reviewer's preference for the design. In another example, the reviewers are asked to evaluate specific characteristics of the design (e.g., color, text layout, thematic representation, etc.) and/or give an overall evaluation or preference. The specific characteristics may be evaluated individually, or by assigning a number to each in order of preference. In another example, a free-form text entry field may be provided where the reviewers can describe the specific attributes (color, text, graphics, layout, etc.) of each design that they like or dislike.

While any suitable interface can be used, presenting the designs in a manner that allows each candidate design to be compared to each other facilitates efficient review by each reviewer. It also allows for effective aggregation as described below. If the designs can not easily be compared on the same page, there can be an indicator for the design on the review page, for example with a summary image for the design, and links to the full presentations of the candidate designs. Any suitable system for providing a response indicia can be used, depending on the method used for aggregating the results. Generally, a web page is used to collect the reviewers' feedback on the designs (STEP 608). Any suitable technique may be used, including without limitation selection by telephone, mobile telephone, and so on.

After review, the results from the reviewers can be aggregated, for example, by any suitable method, to identify the most preferred design(s) (STEP 610). For example, in one embodiment, the Schulze method is used for the comparison. The Schulze method has the advantage that if there is a candidate that is preferred pair-wise over the other candidates, when compared in turn with each of the others, the Schulze method guarantees that that candidate will win. Other methods that are Condorcet methods (i.e., promote the pair-wise winner) are also may be suitable, as may be any other suitable voting system, such as Borda and Instant-runoff voting.

In general, it can be useful to select a number of candidates in their order of preference, and also to communicate how close the response was from the larger group of reviewers with regard to the top selections. For example, the requesting entity may not prefer the top choice selected by the reviewers, but might prefer to select on its own from the top choices determined by the larger group. The requesting entity may conduct other reviews (e.g., marketing surveys, international review, legal review) of the most highly evaluated design, and it may turn out to raise legal concerns that would foreclose adoption.

When a design is selected, the original design developer can be engaged to do additional work with the design or another design developer can be engaged. Typically, the design developer's submission will include all of the information and documentation (including electronic copies of the design in appropriate formats) such that the design is usable in its intended context.

In one embodiment, design developers that submit designs are rated based on the results of their submissions. The ratings are calculated based on the ratings of each design developer prior to the submission, and such other factors as an assigned difficulty level of the design submitted, and the number of other design developers making submissions, and the feedback received for the design. If the difficulty is used in the rating, an assessment of the difficulty of the project will be made when it is accepted. Generally, the amount paid for a project may be related to the difficulty of the project, and so it may be possible to use one to determine the other. A skill rating is calculated for each design developer based on each developer's rating prior to the submission and a constant standard rating (e.g., 1200), and a deviation is calculated for each developer based on their volatility and the standard rating.

The expected performance of each design developer submitting a design is calculated by estimating the expected score of that design developer's submission against the submissions of the other design developers' submissions, and ranking the expected performances of each design developer. The submission can be scored by a reviewer using any number of methods, including, without limitation, those described above. The submission can be scored based on one or more metrics, or on the result of whether the submission candidate is ultimately selected. Thus, an expected score may be a score, or a reflection of the expectation that the submission will be one of the best design(s) selected.

Based on the score of the submitted software and the scores of submissions from other design developers (e.g., whether for the same design or one or more other programs having a similar level of difficulty), each design developer is ranked, and an actual performance metric is calculated based on their rank for the current submission and the rankings of the other design developers. In some cases, the submissions from other design developers used for comparison are for the same design. In some cases, the submissions from other design developers are submissions that are of similar difficulty or scope.

A competition factor also can be calculated from the number of design developers, each design developer's rating prior to the submission of the design, the average rating of the design developers prior the submissions, and the volatility of each design developer's rating prior to submission.

Each design developer can then have their performance rated, using their old rating, the competition factor, and the difference between their actual score and an expected score. This skill rating can be weighted based on the number of previous submissions received from the design developer, and can be used to calculate a design developer's new rating and volatility. In some cases, the impact of a design developer's score on one submission may be capped such that any one submission does not have an overly significant effect on a design developer's rating. In some cases, a design developer's score may be capped at a maximum, so that there is a maximum possible rating. The expected project performance of each design developer is calculated by estimating the expected performance of that design developer against other design developers and ranking the expected performances of each participant. The submissions and participants can be scored by the facilitator, the entity, a review board member, and/or automatically using the software residing, for example, on the server using any number of methods.

One example of a scoring methodology is described in U.S. Pat. No. 6,569,012, entitled "Systems and Methods for Coding Competitions" by Lydon et al, at, for example, column 15 line 39 through column 16 line 52, and column 18 line 65 through column 21 line 51. The methodology is described there with reference to programming competitions, and is applicable to rating the development of designs, as well as data models, applications, components, and other work product created as a result of using the methodology described above.

Another example is described in the example below. Again, while the example is described with respect to software coding competitions, with each participant referred to as a "coder," it should be understood that the rating technique described is also applicable to contestants in contests involving the production of other work product.

In this example, Statistics of Rating, Volatility, and Number of Times Previously Rated are maintained for each contestant. Before competing, new contestants are assigned a provisional rating. In one embodiment, an initial rating of 1200 is designated for new contestants. In another embodiment, a provisional rating may be assigned to new contestants based on their actual performance in the competition relative to the others in the rating group.

In one embodiment, after each competition, each contestant who submitted a submission is re-rated. To perform the re-rating, a rating group is determined. The rating group may include all or a subset of the contestants who participated in a contest. This is most applicable to contests involving a large number of contestants. In contests in which there are only a small number of contestants, the group of contestants that is considered in the rating group may include contestants who submitted submissions in other competitions. In one embodiment, the last 50 submissions, whether in the current contest or in previous contests, are considered when determining the rating, excluding any of the contestant's own previous submissions.

A rating of each contestant within the rating group is determined based on an evaluation score the contestant received, as compared to the scores of the others in the rating group. The rating used for the previous scores is the rating of the coder at the time the coder submitted the solution.

The average rating of the members of the rating group is calculated according to Equation 1.

$$AveRating = \frac{\sum_{i=1}^{NumCoders} Rating_i}{NumCoders} \quad \text{(Equation 1)}$$

In Equation 1, NumCoders is the number of members in the rating group and Rating is the rating of the coder prior to the competition.

A competition factor (CF) is then determined according to Equation 2.

$$CF = \sqrt{\frac{\sum_{i=1}^{NumCoders} Volatility_i^2}{NumCoders} + \frac{\sum_{i=1}^{NumCoders}(Rating_i - AveRating)^2}{NumCoders - 1}} \quad \text{(Equation 2)}$$

In Equation 2, Volatility is the volatility of the coder in the competition before the competition.

The probability of the coder getting a higher score than another coder in the competition ($WP_i$, for i from 1 to NumCoders) is estimated according to Equation 3. In Equation 3, Rating1 & Vol1 are the rating and volatility of the coder being compared to, and Rating2 & Vol2 are the rating and volatility of the coder whose win probability is being calculated.

$$WP = 0.5\left(\text{erf}\left(\frac{Rating1 - Rating2}{\sqrt{2(Vol1^2 + Vol2^2)}}\right) + 1\right) \quad \text{(Equation 3)}$$

Erf(z) is the "error function" encountered in integrating the normal distribution (which is a normalized form of the Gaussian function. It is an entire function, defined by Equation 4. See Eric W. Weisstein. "Erf." From *Math-World*—A Wolfram Web Resource. (http://mathworld.wolfram.com/Erf.html).

$$\text{erf}(z) \equiv \frac{2}{\sqrt{\pi}} \int_0^z e^{-t^2} dt. \quad \text{(Equation 4)}$$

The Expected Performance EPerf of the coder is calculated according to Equation 5, where $\Phi$ is the inverse of the standard normal function.

$$EPerf = -\Phi\left(\frac{ERank - .5}{NumCoders}\right) \quad \text{(Equation 5)}$$

The actual performance (APerf) of each coder is calculated according to Equation 6. ARank is the actual rank of the coder in the competition based on score (1 for first place, NumCoders forlast). If the coder tied with another coder, the rank is the average of the positions covered by the tied coders.

$$APerf = -\Phi\left(\frac{ARank - .5}{NumCoders}\right) \quad \text{(Equation 6)}$$

The "performed as" rating (PerfAs) of the coder is calculated according to Equation 7.

$$PerfAs = OldRating + CF^*(APerf - EPerf) \quad \text{(Equation 7)}$$

The weight of the competition for the coder is calculated according to Equation 8. TimesPlayed is the number of times the coder has been rated before.

$$Weight = \frac{1}{\left(1 - \left(\frac{.42}{(timesPlayed + 1)} + .18\right)\right)} - 1 \quad \text{(Equation 8)}$$

In one embodiment, to stabilize the higher rated members, the Weight of members whose rating is between 2000 and 2500 is decreased 10% and the Weight of members whose rating is over 2500 is decreased 20%.

A cap is calculated according to Equation 9.

$$Cap = 150 + \frac{1500}{1 + TimesPlayed} \quad \text{(Equation 9)}$$

The new volatility of the coder is calculated according to Equation 10.

$$NewVolatility = \sqrt{\frac{(NewRating - OldRating)^2}{Weight} + \frac{OldVolatility^2}{Weight + 1}} \quad \text{(Equation 10)}$$

The new rating of the coder is calculated according to Equation 11.

$$NewRating = \frac{Rating + Weight * PerfAs}{1 + Weight} \quad \text{(Equation 11)}$$

If |NewRating−Rating|>Cap, the NewRating is adjusted so it is at most Cap different than Rating.

In one embodiment, contestants have a reliability rating in addition to the skill rating. In one embodiment, the reliability rating is determined for a predetermined number (e.g., 10, 15, 20) of competitions. In one embodiment, the reliability rating is calculated as the percent of the projects that a contestant presents a timely submission that scores above a predetermined threshold. In one such embodiment, in which a contestant is required to register in advance for a competition, the reliability rating is calculated as the percent of the projects that a registers for in which that contestant presents a timely submission. In one such embodiment, the submission must be above a predetermined threshold.

In one embodiment, prizes or awards are provided, or increased, for contestants who have a reliability rating above a predetermined threshold. In one embodiment, a prize enhancement (i.e., a "bonus"), is provided to contestants who win a competition and who have a reliability rating above a predetermined threshold.

In one such embodiment, contestants are eligible to receive a bonus on top of any prize money won if the contestants' Reliability Ratings are equal to or exceed 80%. Winning members with Reliability Ratings equal to or exceeding 80% and less than 90% will receive a bonus equal to 10% of the prize. For Reliability Ratings equal to or exceeding 90% and less than 95%, winning members will receive a bonus equal to 15% of the prize. Winning members with a Reliability Rating equal to or exceeding 95% will receive a bonus equal to 20% of the prize. In one embodiment, when figuring out the reliability bonus for a contest, the reliability rating used takes into account those projects that were signed up for prior to the current project. In one embodiment, a participant with no previous projects is considered to have no reliability rating, and therefore gets no bonus.

An example of payouts based on the member's Reliability Rating is provided in TABLE 1.

TABLE 1

| 0%-79% | 80%-89% | 90%-94% | 95%-100% |
|---|---|---|---|
| $5,000 | $5,500 | $5,750 | $6,000 |
| $2,000 | $2,200 | $2,300 | $2,400 |
| $ 500 | $ 550 | $ 575 | $ 600 |
| $ 200 | $ 220 | $ 230 | $ 240 |
| $ 100 | $ 110 | $ 115 | $ 120 |

The use of reliability ratings and bonus may encourage contestants to complete their submissions at a high level of quality. Because failure to meet the minimum requirements may result in a loss of the reliability bonuses, contestants are less likely to participate in contests in which they think they will be unable to submit a submission that does not meet the minimum requirements.

In one embodiment, a contestant is not allowed to register for more than a number of contests (e.g., 1, 2, 3), or within a given period of time, if the contestants' reliability rating is below a predetermined threshold (e.g., 60%, 70%, etc.) or if the contestant doesn't have a reliability rating. This restriction discourages contestants from entering into too many contests. In one embodiment, the number of contests that a contestant is allowed to enter at the same time, or within a period of time, increases as the contestants' reliability rating increases. In this way, as the contestant becomes more reliable, the contestant is allowed to enter more and more contests.

In one such embodiment, a contestant with a reliability rating below 50% is allowed to enter only one contest within a one week period, a contestant with a reliability rating above 50% but below 75% is allowed to enter only two contests within a one week period, and a contestant with a reliability rating above 75% is allowed to enter an unlimited number of contests within the one-week period.

In some embodiments, in addition to awards, ratings, and/or rankings, points are awarded to participants for participating in the competition. Points can be awarded for signing up for a competition, submitting a submission, providing a submission that passes one or more review(s), submitting a submission that scores above a certain threshold, and/or some combination or variation thereof. Points can be accumulated by participating in multiple contests, prizes awarded based on points accumulated over a period of time (e.g., monthly, quarterly, annually). In some cases, a total number of points is allocated to a competition, and the number of points awarded to each participant depends on the number of submissions for the contest (either in total or only those that pass a review test) and the score of the submissions. The total number of points attributed to a competition can vary according to elements of the contest, such as deadlines, difficulty, participation expectations (e.g., high or low), etc. By combining skill-based ratings with participation-based awards, contestants that might not to participate (because, for example, they may feel the time needed to achieve a high skill rating is too long) are motivated to participate by the periodic awarding of prizes based on participation. Furthermore, contestants that routinely submit good quality (but not necessarily winning) submissions are rewarded for their continued participation in the contests, even though they may not win individual contests.

In one embodiment, participation points are awarded to submitters who submit submissions receiving a score above a certain threshold, even if (as in some cases) the submission was not deemed to be the best submission. Participation points are awarded based on the number of submissions that are above the threshold and the placement of the scores (e.g., first place, second place, etc.)

As one non-limiting example, the allocation of points among participants in a 500-point contest can be based on the total number of submissions passing minimum review criteria and an overall design score according to TABLE 2:

TABLE 2

| | | # of Submissions that Pass Review | | | | | | |
|---|---|---|---|---|---|---|---|---|
| | Place | 1 | 2 | 3 | 4 | 5 | 6 | 7 |
| Placement Points | $1^{st}$ | 500 | 300 | 200 | 170 | 140 | 120 | 110 |
| | $2^{nd}$ | | 200 | 175 | 140 | 120 | 100 | 90 |
| | $3^{rd}$ | | | 125 | 100 | 90 | 85 | 80 |
| | $4^{th}$ | | | | 90 | 80 | 75 | 70 |
| | $5^{th}$ | | | | | 70 | 65 | 60 |
| | $6^{th}$ | | | | | | 55 | 50 |
| | $7^{th}$ | | | | | | | 40 |

Thus, if three submissions pass review, the first place winner receives 200 placement points, the contestant in second place receives 175 points, and the contestant in third place receives 125 points.

In some cases, points may be deducted for bugs, errors or late submissions. For example, a placement point can be deducted at some periodic interval (e.g., every four (4) hours) that a fix is late. In addition, placement points may also be deducted for bugs, errors, or other issues found in the submissions within some longer period (e.g., 30 or 60 days) of completion of the contest.

Figure 7:
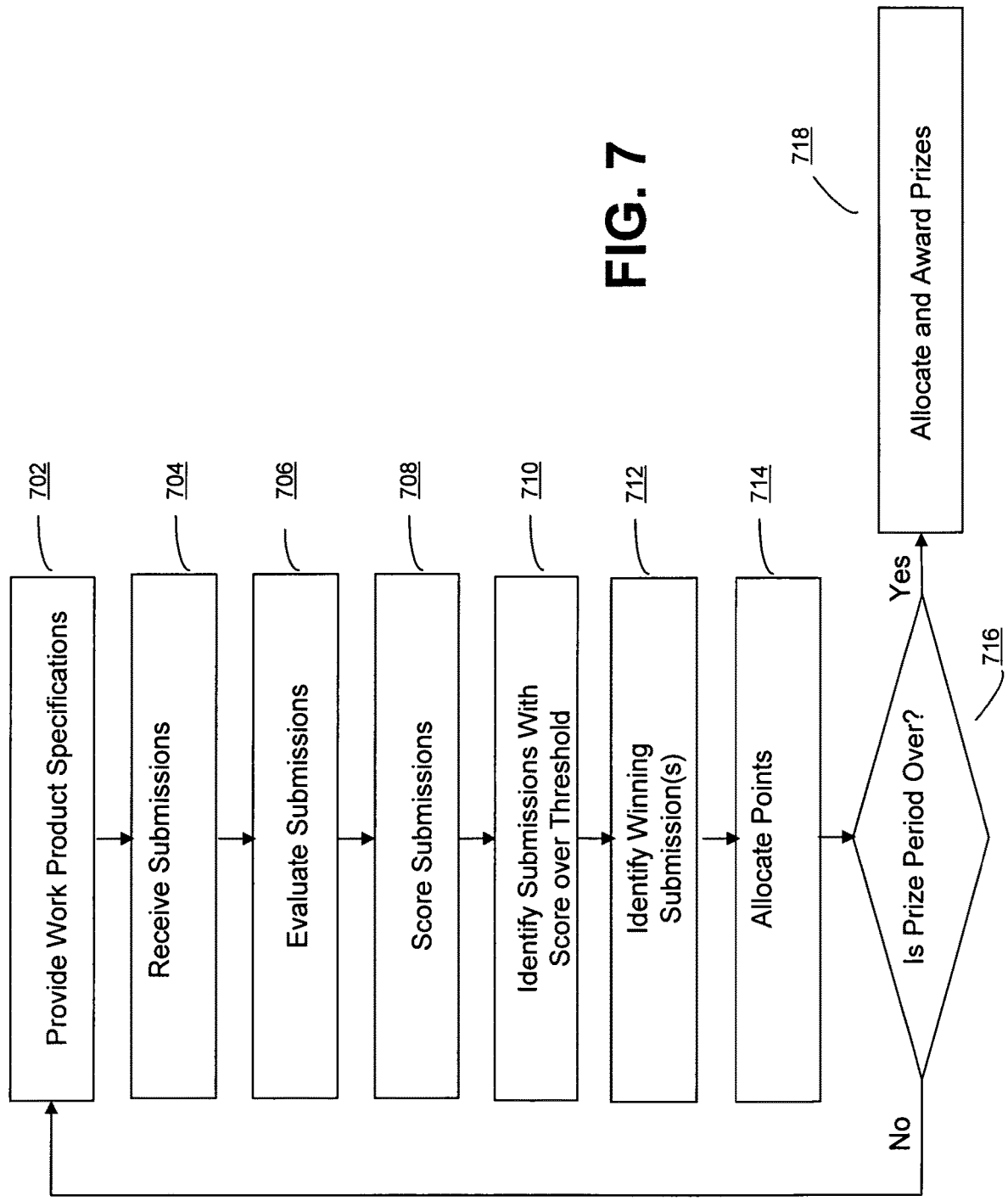
FIG. 7 is a flow chart depicting steps performed in awarding participation points and prizes according to an embodiment of the invention.

FIG. 7 provides a summary illustration of one embodiment of a method for motivating and rewarding participants in a series of production contests, for example, using the domain described above. Work product specifications (describing, for example, the scope, subject matter, aesthetic aspects, and/or functionality of the work product) are provided using the communication server (STEP 702). The specification can be communicated to the distributed community, for example, by posting to a web site that is accessed by members of the distributed community. The specification can be communicated via email, instant message (IM), or through any other suitable communication technique. The specification can also include any timing deadlines for submissions, and the points and/or prizes to be awarded for one or more selected (e.g., winning) work product(s).

One or more of the members of the community creates a submission in response to the requirements described in the specification. Once completed, the submissions(s) are communicated to, and received at the server (STEP 704). The submission(s) are then subject to an evaluation process (STEP 706). In one embodiment, one or more reviewers (e.g., skilled, experienced and/or highly rated experts, focus groups, a customer, etc.) compare the submissions to the specification, and evaluate the submissions on their implementation of the requirements (e.g., compliance with the methodology, overall aesthetic nature of the design, etc.). Based on the evaluations, the submissions are scored (STEP 708). In some cases, a minimum score (e.g., a threshold) is used to identify submissions that meet some minimum criteria (STEP 710). Of the submissions meeting the threshold score, one or more winning submissions are identified (STEP 712), and performance points are awarded (STEP 714) to one or more of the submitters. In some embodiments, the contestants also may be rated, according to a rating technique, in response to the score and a previous (or initial) rating. This rating may be a skill rating and/or a reliability rating.

In some embodiments, prizes (e.g., money, gifts, etc.) may be periodically (e.g., quarterly) awarded to the participants that accumulate the highest number of points. For example, if a prize period such as a quarter is over (STEP 716) the prizes and/or awards for that period are allocated and awarded to the contestants (STEP 718) according to the prize allocation formula for that particular period. If the prize period is not over, the contestants can continue to participate in additional production contests and earn additional points until the prizes are awarded. In some cases, the points awarded to contestants are reset at the end of each period (e.g., all contestants start the period with zero points), and in other embodiments the points are carried over from prize period to prize period.

For example, total prize pool of $75,000 may be allocated to a particular quarter, and allocated such that the participant with the highest point total (either for that quarter or on a continuous basis) receives $15,000, the second highest $10,000, the third highest $5,000, etc. until the prize pool is exhausted. In some cases, minimum point values are required to receive a prize. In some embodiments, dollar values can be attributed to participation points, such that the prize received is proportional to the number of points.

In some embodiments, portions (or all) of a prize pool can be allocated to participants that have participated in fewer than some number (e.g. 6) contests in order to encourage new participants to continue to enter contests even if they do not receive high scores. Likewise, some or all of the prize pool can be allocated to contestants that have submitted over some number (e.g., 30) submissions to reward longtime participants.

The prizes (e.g., the money, trips, merchandise, etc.) may be provided by one or more entities (208 of FIG. 2) as sponsor of a particular prize period. For example, a computer company can sponsor a year-long prize period and contribute $100,000 to the prize pool in return for advertising rights during the contests, access to the contestants (via email, for example) as well as general publicity.

In some cases, ties may exist among participants. In one embodiment, the tie-breaker is the number of higher-placed submissions submitted in the quarter. A further tie breaker can be based on the highest average individual component score of the components (or some smaller number thereof) used to develop the placement scores for the tied competitors. If a tie still remains, then the tied competitors can share prize money equally. In some cases, some portion of the prize pool is allocated to prizes for top point-earners and some portion of the prize pool is allocated for distribution among all participants.

Participants earning top prizes and/or point values may be also awarded additional prizes such as trips, access to potential employers, entries in invitation only competitions, and the like.

In embodiments where the competition includes both a design phase and a development phase (e.g., a software contest), points received from participating in the different phases may be pooled such that a participant can accumulate points during each phase. In some cases, points received from participating in different phases are segregated such that prizes can be awarded to designers having the most points and to developers having the most points independently.

In one embodiment, the external entity 208 is interested in receiving the developed design or the code, as well as obtaining developers' ratings, scores and point totals. In some cases, the entity 208 may only be interested in the ratings. For example, the external entity 208 may ask developers to participate in the development process just so that the developers are rated, and their skills can be objectively evaluated for future projects of greater value, or to determine which developers are more skilled. The requester could, in addition, have some interest in the developed design or code, and may have some interest in using the developed intellectual asset for its business or otherwise.

There can be a significant benefit to using personnel who are rated highly, using the process described above, as design reviewer(s) in the design review process and/or code reviewer(s) in the code review process. One of the traditional problems with conducting code reviews has been that the abilities of the reviewers were not established. Review by a poorly skilled developer can result in an inadequate review. By using the process to select as reviewers only developers with sufficient skill (as determined by the process), the process itself insures its success.

In one embodiment, this software development process is adopted by a software development group within an organization. The development performed by the group is conducted using this process. Each developer in the group has a rating, and the developers work to improve and/or maintain their ratings. Developers who have high ratings can participate in reviews (e.g., the design review process or the code review process). In one implementation, developers receive additional benefits and or compensation for achieving a high rating. Likewise, developers can receive additional benefits and/or compensation for such participation in a review process. The requestors in this example are product or program managers, charged with directing the software development.

In another implementation, an outside organization such as a consultant can use the system and methods described above to evaluate and rate the development competencies of a development group. In this way, the consultant can rate the developers not only against themselves, but against other developers affiliated with other organizations who have participated or are participating in the system. The evaluator provides the service of evaluation and reporting as described above. One benefit to this approach is that the scoring of the intellectual assets are more likely to be unbiased if the reviewers are not personally known to the developers, and comparing the skills of any one developer against a large pool of developers provides a more accurate representation of that developers skill level with respect to his or her peers.

In general, the process of soliciting work product from a large, disperse, and often unrelated group of individuals for potential inclusion into a resulting product (whether it be tangible or intangible) can be applied in any situation in which such submissions can be received and evaluated. By breaking the desired end product (e.g., software application, automobiles, textbooks, songs, etc.) into components of increasingly smaller granularity and advertising the need for such components to a large pool of candidates (some of which may have been pre-screened), the ability to find and evaluate the work product that meets the specific requirements for that component increase.

Thus, the method may be applied to the production of any type of intellectual assets that are the result of intellectual work. Just as examples, these intellectual assets can include any sort of design, drawing, invention, creation, development, work of authorship, diagnosis, treatment, proposal, suggestion, and so on. Just as examples, these intellectual assets might be generated by engineers, designers, developers, architects, doctors, nurses, lawyers, veterinarians, planners, and so on, whether as individuals, groups, firms, collectives, and so on.

Preferably, the production of the intellectual asset is accomplished such that the production of the asset or portions of the asset can be accomplished by a contestant in a reasonable period of time, and the evaluation criteria sufficiently clear that the contestant can determine whether the contest is worth participating in. This may be accomplished by providing clear guidelines and rules for evaluation, as appropriate for the work product in question. For example, if the work product is an engineering design, review by design engineers would be appropriate. If the work product is a song, review by a small number of knowledgeable song writers or producers may be appropriate and/or review by a large number of potential customers may be appropriate.

In all cases, appropriate portioning (e.g., division and/or subdivision) of the production task into one or more work product elements may be necessary such that each production task may be accomplished by contestant(s) with a particular skill set. It also may be useful to construct the discrete tasks such that they may be accomplished by an individual or team without interaction with any other contestant so that tasks may be accomplished in parallel. The activity of portioning of an intellectual asset may itself be work product that may be accomplished by way of a production contest. Likewise, the aggregation of sub-divided work-product elements into a desired asset may be accomplished by way of a production contest.

As an example, a car manufacturer that traditionally buys brakes for all of its models from one brake manufacturer, the manufacturer can publish a set of specifications (for each type of car, potentially) and any brake manufacturer can then bid on supplying the brakes in much smaller volumes. The brake suppliers can then apply this model to its suppliers (disk manufacturers, cylinder parts makers, etc.). Using these techniques, the brake manufacturer has access to hundreds or even thousands of people, groups of people and companies that have specified knowledge and/or skill in a distinct area—e.g., building braking systems. Instead of the traditional challenges of how to manage a large internal workforce, the company can use the processes described herein to manage customized product design at a large scale. For example, the company will be able to determine, design, and manufacture the optimal components to be included in a large list of customized brake systems and supply these systems to automobile manufactures. As a result, the variability of products increases (allowing the company to provide specialized braking systems for numerous applications) while decreasing the cost.

The process can be applied to the production of virtually any activity where the output can be evaluated based on some pre-agreed criteria, where the company can assess the risk of agreeing to provide some work product based on the opportunity cost of making that product and the potential reward for each product. As another example, a song (or even an album or soundtrack) includes various components (e.g., lyrics, music, instrument tracks, vocal tracks, and arrangements) that can be combined into an end product. Using the techniques described herein, a recording artist or studio can access a pool of musicians and composers, and evaluate each person's submission such as a piano track for one particular song. The criteria may be based on an individual's personal likes, or in some cases the track (or tracks for different versions of the song) can be selected based on input from a set of reviewers. Using this approach, songs could be written and recorded using many different songwriters and musicians. The contestants would maintain interest in the process by receiving points for consistently delivering work product that gets evaluated above some relative threshold.

The same model can be applied to service offerings such as law, accounting, landscaping, medical services, etc. For example, a company needing various legal services such as incorporation papers, employee agreements, license agreements, reviews of lease agreements, patent applications, trademark filings, etc. can use the methods and systems of the invention to solicit multiple submissions from various firms. By allocating points to each participating firm (or individual attorney), the participants can receive compensation for their efforts, even if their submission was not selected for use. In some embodiments, the firms may use similar techniques to produce the end product, such as a draftsman, a patent attorney, and a software engineer to provide the drawings, claims, and specification of a patent application, respectively.

Figure 8:
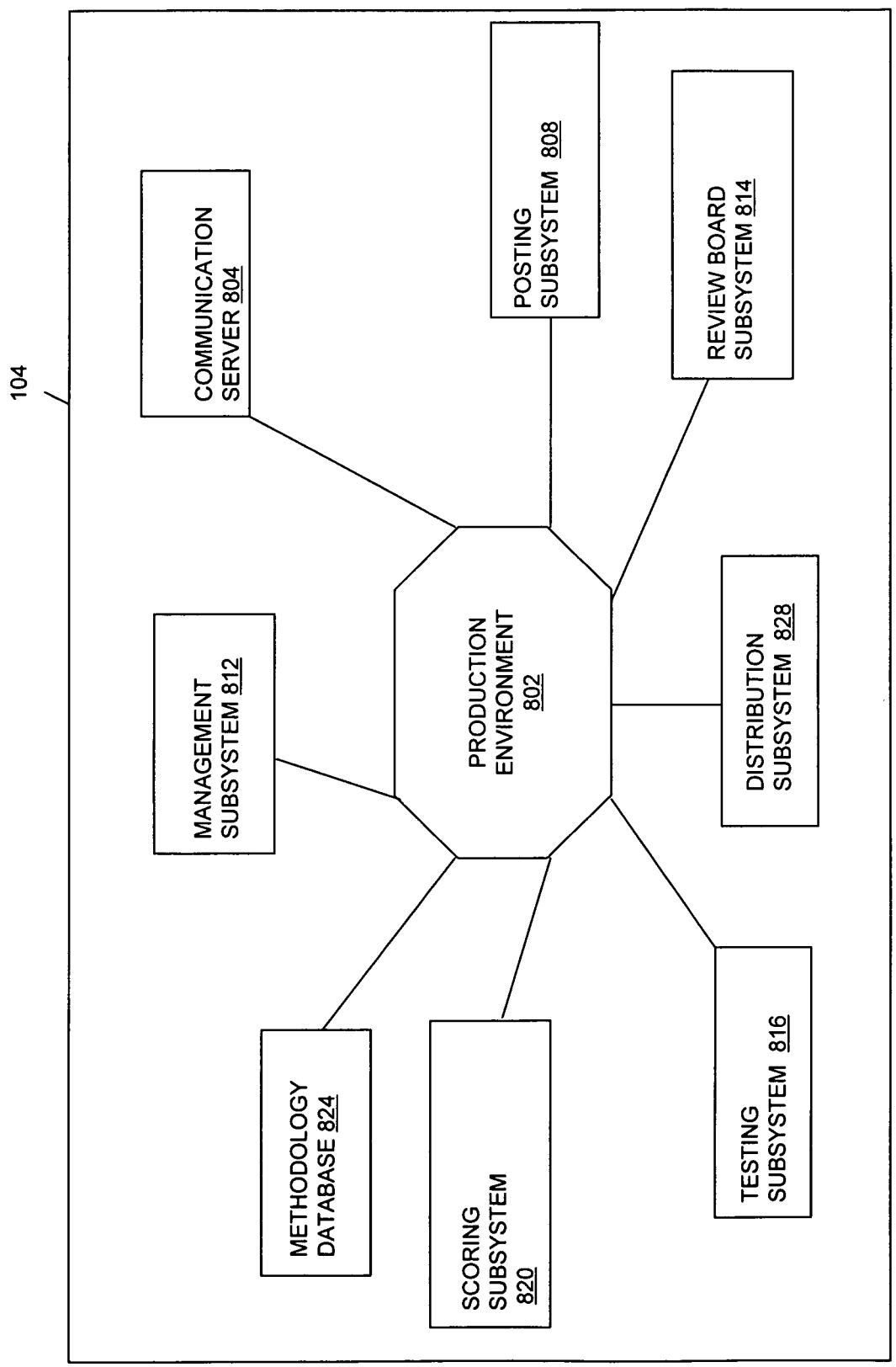
FIG. 8 is a block diagram of an embodiment of a server such as that of FIG. 1 to facilitate the development and/or testing of software programs.
Figure 9:
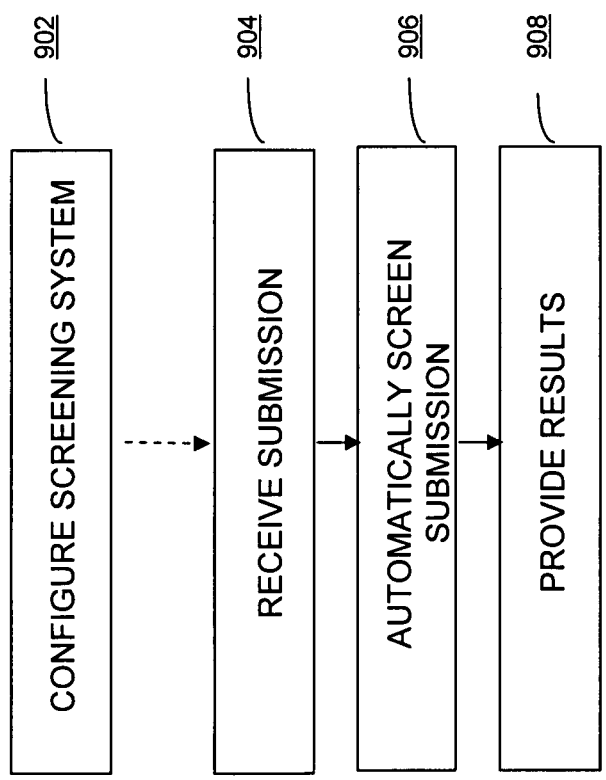
FIG. 9 is a flow chart depicting steps performed in the screening of a submission with a screening system in an embodiment of the invention.

Referring to FIG. 8, the server 104 can include a number of modules and subsystems to facilitate the communication and development of software specifications, designs and programs. The server 104 includes a communication server 804. One example of a communication server 804 is a web server that facilitates HTTP/HTTPS and other similar network communications over the network 112, as described above. The communication server 804 includes tools that facilitate communication among the distributed community of programmers 212, the external entity 208, the facilitator 400, and the members of the review board(s) (commonly referred to as "users"). Examples of the communication tools include, but are not limited to, a module enabling the real-time communication among the developers 404 (e.g., chat), news groups, on-line meetings, and document collaboration tools. The facilitator 400 and/or the external entity 208 can also use the communication server 804 to post design or specifications for distribution to the distributed community of programmers 212.

Furthermore, the server 104 also includes a development environment 802 to facilitate the software development domain 204 and the design and development process, for example, and the subsystems and modules that support the domain 204. For example, the server 104 can include a development posting subsystem 808, a management subsystem 812, a review board subsystem 814, a testing subsystem 816, a scoring subsystem 820, a methodology database 824, and a distribution subsystem 828.

In one embodiment, the development posting subsystem 808 allows users of the system to post specifications, submit designs, post selected designs, submit software programs and test cases, and post selected software programs for distribution. The posting subsystem 808 identifies the users based on their role or roles, and determines which functions can be accessed based on individual security and access rights, the development phase that a project is currently in, etc. For example, if a particular project is in the design development phase, the posting subsystem 808 can determine that the external entity sponsoring the project has read/write access to the specification, and can re-post an updated specification if necessary. The facilitator 400 may have read access to the specification, as well as access to other specifications attributed to other external entities they may support. In some embodiments, the entire distributed community of programmers may be able to view all of the currently pending specifications, however the posting subsystem may limit full read access to only those developers meeting one or more skill or rating criteria, as described above. Once designs are submitted, access to the submitted designs can be further limited to only review board members, or in some cases other participants in the process.

The development posting subsystem 808 also enables the server 104 or other participants to communicate with potential developers to promote development projects and grow the community of programmers that participate in the development process. In one embodiment, the development posting subsystem 808 displays an advertisement to potential developers. In one embodiment, the advertisement describes the project using text, graphics, video, and/or sounds. Examples of communication techniques include, without limitation, posting these ads on the server's web site, displaying statistics about the project (e.g., planned royalties paid to developers, developers who are participating in this project, development hours available per week). Moreover, in one embodiment the development posting subsystem 808 accepts inquiries associated with development projects. In further embodiments, the development posting subsystem 808 suggests development opportunities to particular developers. The development posting subsystem 808 may analyze, for example, the rating of each member of the distributed community, previous contributions to previous development projects, the quality of contributions to previous component development projects (e.g., based on a score given to each developer's submission(s) as discussed above), and current availability of the developer to participate.

The server 104 also includes a management subsystem 812. The management subsystem 812 is a module that tracks the progress of design and development projects using the software development environment 204. The management subsystem 812 also facilitates the enrollment of new users of the system, and assigns the appropriate security and access rights to the users depending on the roles they have on the various projects. In some versions, the management subsystem 812 can also compile and track operational statistics of the software development environment 204 and users of the system. For example, to determine the appropriate compensation to be awarded to a developer submitting a wining design, the management subsystem 812 may review previously completed projects and assign a similar cash award. Similarly, in cases where the difficulty level of a posted design or program is very high, the management subsystem 812 can review information about individual programmers to determine those developers who have historically performed well on like projects. In addition, the management subsystem 812 may be used to analyze overall throughput times necessary to develop operational programs from a specification provided by an external entity. This can assist users of the system in setting the appropriate deliverable dates and costs associated with new projects.

The server 104 also includes a review board subsystem 814. The review board subsystem 814 allows review board members, external entities, the facilitator, and in some cases developers in the distributed community to review submissions from other developers, as described above. In one embodiment, the communication server 804, the development posting subsystem 808, the management subsystem 812, the review board subsystem 814, the testing subsystem, the scoring subsystem, and the methodology database reside on the server 104. Alternatively, these components of the software development environment 204 can reside on other servers or remote devices.

The server 104 additionally includes a testing subsystem 816. The testing subsystem 816 enables the testing of the submitted programs, applications and/or components. In one embodiment, the testing server 808 is used by the review boards, the facilitator 400, and/or the external entity 208 to review, evaluate, screen and test submitted designs and software programs. The testing subsystem 816 may include a screening system, for screening submissions. The screening system may be a flexible tool that enables use of the functions and results of the screening system by the different users involved in the submission process, such as contestants, reviewers, and administrators. The testing subsystem 816 can also execute test cases developed and submitted by the developer 404 against some or all of the submitted programs, as described above. Moreover, the testing subsystem 816 may execute an automated test on the component or application, such as to verify and/or measure memory usage, thread usage, machine statistics such as I/O usage and processor load. Additionally, the testing subsystem 816 can score the component by performance, design, and/or functionality. The testing subsystem 816 can be a test harness for testing multiple programs simultaneously.

The server 104 also includes a scoring subsystem 820. In one embodiment, the scoring subsystem 820 calculates scores for the submissions based on the results from the testing subsystem 816, and in some embodiments ratings for each participant in one or more coding competitions, previous development submissions, or both. In other embodiments, the scoring subsystem 820 can calculate ratings for developers based on their contributions to the project. In embodiments where points are awarded for participation in the contests, the scoring subsystem 820 calculates the points awarded to each contestant. In one embodiment, the scoring subsystem 820 allocates prizes as described above.

The server 104 also includes a methodology database 824. The methodology database 824 stores data relating to the structured development methodology 220. In one embodiment, the methodology 220 may stipulate specific inputs and outputs that are necessary to transition from one phase of the development project to the next. For example, the methodology 200 may dictate that, in order to complete the specification phase of the project and being the design phase, a checklist of items must be completed. Furthermore, the methodology database 824 may store sample documents, designs, and code examples that can be used as templates for future projects, and thus impose a standardized, repeatable and predictable process framework on new projects. This standardization reduces the risks associated with embarking on new software development projects, shortens the overall duration of new development projects, and increases the quality and reliability of the end products.

The server 104 also may include a distribution subsystem 828. The distribution subsystem 828 can track and store data relating to software products (e.g., specifications, designs, developed programs) that have been produced using the domain 204. In one embodiment, the distribution subsystem 828 includes descriptive information about the entity 208 that requested the product, the entry and exit points of the domain 204, significant dates such as the request date, and the delivery date, the names and/or nicknames of the developers that participated in the development of the product. The distribution subsystem 828 can also include detailed functional information about the product such as technology used to develop the product, supported computing environments, as well as others. In some embodiments, previously distributed software products may be updated or patched, as described above. In such cases, the distribution subsystem 828 facilitates the identification of the entity or entities 208 that may have older versions of the product, and subsequent communication and distribution of updated versions, where applicable. In some cases, the distribution subsystem 828 can also function as a source code management system, thereby allowing various versions of previously developed software products to branch into distinct software products having a common provenance.

Although described above as independent subsystems and modules, this is for exemplary purposes only and these subsystems and modules may alternatively be combined into one or more modules or subsystems. Moreover, one or more of the subsystems described above may be remotely located from other modules (e.g., executing on another server 104 in a server farm).

As mentioned, in one embodiment, a screening system is used as part of the submission and review process. The screening system is a flexible tool that accommodates the users such as submitters, reviewers, and administrators. The tool provides automated verification of submissions to determine whether they meet minimum, typically formal, requirements. The tool can provide appropriate reporting of errors for submitters and reviewers, and for administrators to monitor the production contest process.

Contestants, for example, may use the tool to prevent mistakes that would prevent a potentially good submission from completing a review process because of a simple mistake or omission. A series of validations may ensure that a submission meets predetermined criteria. The criteria may be specific for each submission. For example, an administrator may provided configuration files for the tool that will be specific to that submission, and verify the submission requirements for that submission.

For example, one aspect of a valid design submission may be to provide a UML file in a particular format. The absence of one this required file would result in a failed submission. If run prior to submission, the screening system may provide a potential submitter with advance notification about such a problem. The submitter could then fix the problem prior to submission. After submission, the screening system may provide a submitter with immediate, automated feedback about the submission. If there is enough time left in that contest, the submitter may be able to resubmit after making the appropriate changes. A screener may use the screening system to assist with screening submissions. The screening system output may indicate to a reviewer that a desired submission element is missing, not named appropriately, or otherwise does not meet requirements, and so on. The reviewer may use this tool to quickly eliminate a submission in a screening process, and/or to provide feedback in a formal review.

In one embodiment, a submission tool is used to implement predetermined validation rules that are used to validate a submission. In one embodiment, the submission tool has a pluggable framework that allows validators for verification of rules to be added or removed for a particular contest. Each of the validation rules may be configurable for the requirements of a particular contest. The submission tool may also provide an audit mechanism and a reporting mechanism for the submissions, to track progress and communicate results.

In one embodiment the screening system is a service that runs on a contest server. The user uploads a submission. The user may need to log in or otherwise authenticate to the contest server in order to upload the submission. The user may need to have previously registered for and/or otherwise have been assigned to a contest. The user may need to identify the contest or project for which the submission is being submitted. In one embodiment, a successful upload automatically queues a submission for review with the screening using the validators and configuration for that particular submission.

In one embodiment, a validator is used to verify that a rule or set of rules has been followed. A validator may be configurable, as appropriate, for a particular contest, so as check the submission for the particular requirements of that contest.

In one embodiment, appropriate validators are run so as to identify as many problems at once. Thus, if a component specification rule validator, for example, determines that the component specification file is improper or not available, a UML validator may still be run to determine whether required UML files are provided. If, however, a directory validation validator determines that a required "/docs" directory does not exist, it may not check for a component specification that that was expected to be placed in the "/docs" directory. Yet, the log file rule validator may still verify that expected log files in the "/log" directory exist. By providing as much information as possible, the screening system enables a contestant to fix as many problems as possible at one time.

In one embodiment, there are a number of validators, which each verify a rule or rules.

File Type Rule Validator: In one embodiment, file types may be specified and required for a submission. For example, Java submissions may be required to be in a JAVA archive (jar) file format and net submission may be required to be in a zip archive file. Graphics submissions may be required to be in a GIF (.gif) or JPEG (.jpg) format. Documents may be specified for a rich text (.rtf) format. In one embodiment, the validator uses the file name extensions to determine file types. In one embodiment the validator uses other characteristics of the file type (e.g., magic number, expected formats, etc.) to verify the file type. In one embodiment, the validator is configured with standard file types, and is configurable to have additional file types specified. If a validator determines that a submission is valid, and the submission is an archive or collection of files, it may unpack the collection for further interrogation. In one embodiment, a configuration file determines the files and file types that are verified for a particular submission.

Directory Rule Validator: In one embodiment, a directory structure (and related files and file names) may be specified that each submission must adhere to. A validator may be used to interrogate the directory structure and determine that the required directories and files are present. The validator may be configurable so that the directories that are expected for a particular contest may be specified. Extra and missing directories may be reported as errors. The validator may also validate the package structure for the submission.

In one embodiment, the directory rule validator makes use of a directory validation subsystem in which the desired directory and file structure may be described in XML. Likewise, the validators for each directory and file (e.g., File Type rule validator) and the associated rules may be specified using XML constructs. The directory rule validator may validate the directory structure, and identify any deviation from the desired the directory. The directory rule validator may also initiate other validators on the files that are identified in the directories.

In one embodiment, validators, such as the Directory validator are constructed such that they allow additional validators to be added, for additional kinds of files. In one embodiment, a validator may be added, for example, to check that the encoding used in a file is as expected. In one embodiment, this can be accomplished by modifying a configuration file, rather than changing the code of the application.

Specification Rule Validator: In one embodiment, specifications for a submission may indicate that a valid submission must contain a specification file in particular directory, for example, under a directory called "/docs." This file may be required to be in a particular format, for example in rich text format (rtf). A validator may be used to check for the presence of this file. The validator may be configurable to search for a particular name by wild card, exact match and/or file extension. The file size may also be interrogated, to determine if it is above a predetermined threshold, and the file type may be verified, for example, by the file type rule validator. In one embodiment, the Specification Rule Validator checks for the presence of specific content in a file that is determined to be a specification file. For example, if the file is required to have specific sections, with appropriate titles, the presence of that information could be verified.

Log File Rule Validator: In one embodiment, a validator may verify that a submission contains log files from the successful execution of unit tests. For example, the validator may verify that the two files included are a .txt and .xml located under/log. The validator may be configurable to handle new file types. The validator may check each file for the appropriate extension. The validator may verify each file size to be greater than a predetermined size.

UML Rule Validator: In one embodiment, a validator may verify that a submission contains specified documentation in a UML format. For example, the validator may verify that a design file is a "zargo" or "zuml" file located in a director called "/docs." The validator may be used to check for the presence of this file. If the file is present, the validator may parse the file to verify the existence of one or more use cases, class diagrams, and/or sequence diagrams. This may be accomplished through use of an parser that provides the ability to parse the XML elements that are in a UML file. An XMI (XML Data Interchange) file for example, may describe the various diagrams and object model properties that constitute a software design. An XMI parser may parse through such an XMI file and hand off data to the rule validator for processing and interpretation.

In one embodiment, the UML Rule Validator also may review the contents of a UML file to determine whether the expected types of diagrams are present. For example, if Class, Use Case, and Sequence diagrams are expected, the UML Rule validator may verify that one or more of these types of diagrams are included. As another example, if Activity diagrams are expected, the UML Rule validator may verify that such diagrams are included. The UML Rule validator may use a UML parser to parse the UML to make this determination.

In one embodiment, the UML rule validator is constructed so that the types of diagrams that it can parse may be configured using a configuration file, rather than by changing the code for the validator. This provides additional flexibility.

In one embodiment, a rule, such as the UML rule may not only validate that the submission is appropriate, but may suggest changes to, or even modify, the submission to make it better compliant. The is particularly useful when an issue that is identified by the rule is compliance with a style or convention, rather than omitted or improper content. For example, with regard to the UML rule, if an expected convention for UML diagrams would specify that items are a certain color, or have a certain naming convention, the UML rule may suggest changes to the submitted content to be compliant. The UML rule may issue a warning. In one embodiment, the UML rule may also make the relevant changes, if possible. As another example, if the Style rule validator, described further below, detects an incorrect style, the rule may signal a warning, but also change the style to be compliant, if possible.

Source Code Rule Validator: In one embodiment, a validator may be used to verify that a submission contains source code and test code under a specified directory structure. For example, for JAVA software code submissions, code may be expected in the /src/java/main directory and tests expected in the /src/java/tests director. As another example, for .net software code submissions, code may be expected in the /src/csharp/main directory, and tests expected in the /src/csharp/tests directory. In one embodiment, the validator checks for the existence of source code under the specified directories. If source code exists, the validator may check the file size and extension. For example, each file may be checked against a list of appropriate file extensions relative to the project type. This validator may be configurable for the particular source code files and file types expected for a particular contest. In one embodiment, the validator also attempts to parse and/or compile the source code, to determine whether there are any compilation errors. In one embodiment, the source code validator compiles and runs unit tests, to determine whether they compile and run against the submission.

Style Rule Validator: In one embodiment, a validator may verify that configuration files contain the formatting style indicated in the requirements. If the formatting style may be automatically verified, for example through use of commercially available tools such as CHECKSTYLE, such verification may be may performed and reported.

Personal Information Rule Validator: A validator may be used to determine whether a submission includes any personal information. For example, in an effort to make the review process impartial, design and development submissions may not be allowed to include personal information. A validator may be provided to search for personal information such as a member name, nickname, or handle, an email address, mail address, telephone number, and so on. The validator may refer to a database of personal information about the submitter, and search for information specific to that submitter. For example, the validator may determine the submitter's name, handle (e.g., a nickname, and/or name used in competitions), email address, and so on, and search specifically for that information. The validator may also search for all names and handles that are known to the system. In one embodiment, the validator is configurable to use new input types, and new scan rules for identifying personal information.

Image Rule Validator: In one embodiment, a validator may verify that images files are of the image type and format as indicated in the requirements. This may include uncompressed image size, black and white vs. color, pixels/bit, etc. In general, this information may be verified by opening the image file and uncompressing as necessary. It also may involve testing aspects of the image file.

Document Rule Validator: In one embodiment, a validator may verify that document files contain the formatting size, style and other requirements specified. This may involve opening the file, and determining such information as section headers, formatting of the document, font used, word count, and any other document characteristics.

For example, in one embodiment that relates to computer programming competitions, the rules in TABLE 3 are used for JAVA design, C # design, JAVA development and C # development competitions. For example, there are 5 rules specified, for Java design, which include a "jar file rule," "design dir rule," "component specification rule," "Poseidon (UML) file rule," and "personal info rule."

TABLE 3

| | |
|---|---|
| Java Design | Jar File Rule |
| | Design Dir Rule |
| | Component Specification Rule |
| | Poseidon File Rule |
| | Personal Info Rule |
| C# Design | Zip File Rule |
| | Design Dir Rule |
| | Component Specification Rule |
| | Poseidon File Rule |
| | Personal Info Rule |
| Java Development | Jar File Rule |
| | Java Dev Dir Rule |
| | Component Specification Rule |
| | Test Log Rule |
| | Java Source Code Rule |
| | Java Check Style Rule |
| | Personal Info Rule |
| C# Development | Zip File Rule |
| | C# Dev Dir Rule |
| | Component Specification Rule |
| | Test Log Rule |
| | C# Source Code Rule |
| | Personal Info Rule |

These rules are further described in TABLE 4.

TABLE 4

| | |
|---|---|
| Jar File Rule | The submission filename extension should be jar. |
| | The submission should be identified as application/zip by magic numbers. |
| | The submission should be extracted successfully by compression utility. |
| Zip File Rule | The submission filename extension should be zip. |
| | The submission should be identified as application/zip by magic numbers. |
| | The submission should be extracted successfully by compression utility. |
| Design Dir Rule | Submission should contain a top-level folder named docs. |
| Java Dev Dir Rule | Submission should contain a top-level folder named docs. |
| | Submission should contain a top-level folder named src. |
| | There should be a sub folder named java under src. |
| | There should be a sub folder main under java. |
| | There should be a sub folder tests under java. |
| C# Dev Dir Rule | Submission should contain a top-level folder named docs. |
| | Submission should contain a top-level folder named src. |
| | There should be a sub folder named csharp under src. |
| | There should be a sub folder main under java. |
| | There should be a sub folder tests under csharp. |
| Component Specification Rule | Submission should contain a component specification file under docs. |
| | The filename extension should be rtf. |
| | The filename should contain both "component" and "specification" (case insensitive, position does not matter). |

TABLE 4-continued

| | |
|---|---|
| Poseidon File Rule | The file should be identified as application/rtf by magic numbers.<br>Submission should contain a Poseidon design file under docs.<br>The filename extension should be either zuml or zargo.<br>The file should be identified as application/zip by magic numbers.<br>The file should be extracted successfully by compression utility.<br>The extraction should contain an XMI file which can be parsed by XMI parser.<br>There should be at least one class diagram.<br>There should be at least one sequence diagram.<br>There should be at least one use case diagram. |
| Java Source Code Rule | Submission should contain at least one Java source file under src/java/main.<br>The filename extension should be java.<br>The file should have positive length.<br>Submission should contain at least one Java source file under src/java/tests.<br>The filename extension should be java.<br>The file should have positive length. |
| C# Source Code Rule | Submission should contain at least one C# source file under src/csharp/main.<br>The filename extension should be cs.<br>The file should have positive length.<br>Submission should contain at least one C# source file under src/csharp/tests.<br>The filename extension should be cs.<br>The file should have positive length. |
| Test Log Rule | Submission should a top-level folder named log.<br>There should be at least one plain text log under log.<br>The filename extension should be txt.<br>The file should have positive length.<br>There should be at least one XML log under log.<br>The filename extension should be xml.<br>The file should have positive length. |
| Java Check Style Rule (Generates Warnings Only) | Runs style checking software against src/java/main with the command registered for stylecheck_command.<br>Each error is logged separately.<br>Runs style-checking software against src/java/tests with the command registered for stylecheck_test_command.<br>Each error is logged separately. |
| Personal Info Rule (Generates Warnings Only) | Searches all the files for submitter's handle, first name, last name and emails.<br>The match is case insensitive.<br>The rtf files as well as the extracted XMI file will all be searched.<br>Each match will be logged on a per file basis. That is, if your handle appears multiple files in a SINGLE file it will be logged only once. However if the handle appears in another file it will be logged again. |

In one embodiment, the screening system provides a response, including whether or not the screening tests for a particular submission passed. If a screening test does not pass, appropriate explanation is provided. Exemplary response codes and associated messages are provided in TABLE 5. Additional responses and errors may be appropriate.

TABLE 5

| RESPONSE CODE | RESPONSE_TEXT | response severity id |
|---|---|---|
| tcs-001 | Your submission distribution is not a jar file. | 1 |
| tcs-002 | Your submission distribution is not a zip file. | 1 |
| tcs-003 | Your submission does not conform to the directory standard. | 1 |
| tcs-004 | Your submission does not contain a component specification document in rich text format (rtf). | 1 |
| tcs-005 | Your submission does not contain a/log directory from the successful execution of unit tests. | 1 |

TABLE 5-continued

| RESPONSE CODE | RESPONSE_TEXT | response severity id |
|---|---|---|
| tcs-006 | Your submission is missing the appropriate unit test log files. | 1 |
| tcs-007 | Your submission does not contain a zargo or zuml file. | 1 |
| tcs-008 | Your submission does not contain one or more uses cases. | 1 |
| tcs-009 | Your submission does not contain one or more class diagrams. | 1 |
| tcs-010 | Your submission does not contain one of more sequence diagrams. | 1 |
| tcs-011 | Your submission does not contain source code under/src. | 1 |
| tcs-012 | Your submission does not contain test source code under/src. | 1 |
| tcs-013 | Style checker has produced the following warnings. | 2 |
| tcs-014 | Your submission contains personal information. | 1 |
| tcs-015 | Your submission has passed the auto screening process. | 3 |

Some of the messages in TABLE 5 are warnings, with which a submission may be allowed to proceed to review. Some of the messages in TABLE 5 are fatal problems, which would result in a submission not passing screening.

In one embodiment, after submitting a submission, the contestant can determine the status of the submission, and the results provided by the screening system. In one embodiment, a contestant, review, or administrator can go to a web page provided by the contest server, to determine whether the submission has been screened, and if it has been screened, to determine the results.

Thus, in one embodiment, a method for screening submissions in a production contest system includes receiving a production competition submission from the authenticated contestant (STEP 904). The method also includes automatically screening the submission with a screening system to verify that the submission (STEP 906). This step may include determining whether the submission meets predetermined formal requirements. These formal requirements may be specified in configuration files for the particular submission. The configuration files may specify what validators may be used, and what data the validators are expected. The method also includes providing feedback to the contestant and a contest administrator (such as a reviewer) regarding the results of whether the submission meets the predetermined formal requirements (STEP 908). In this way, without human intervention, a contest participant is able to determine if her submission meets the initial screening requirements, and take corrective action if it does not.

In one embodiment, a contest administrator configures the screening system with configuration information for a particular contest prior to the contest (STEP 902). The configuration information may include configuration of the validators that may be employed. The configuration information may includes the information for validators that require or use such information as to what particular directories, files, file types, type of information to verify, tools to use, or other applicable information may be expected. The configuration information may include additional validators or tools to be used in the screening process. Once configured, the screening system has the information that it needs to assist in screening the submissions to verify the submissions as they are submitted.

Figure 10:
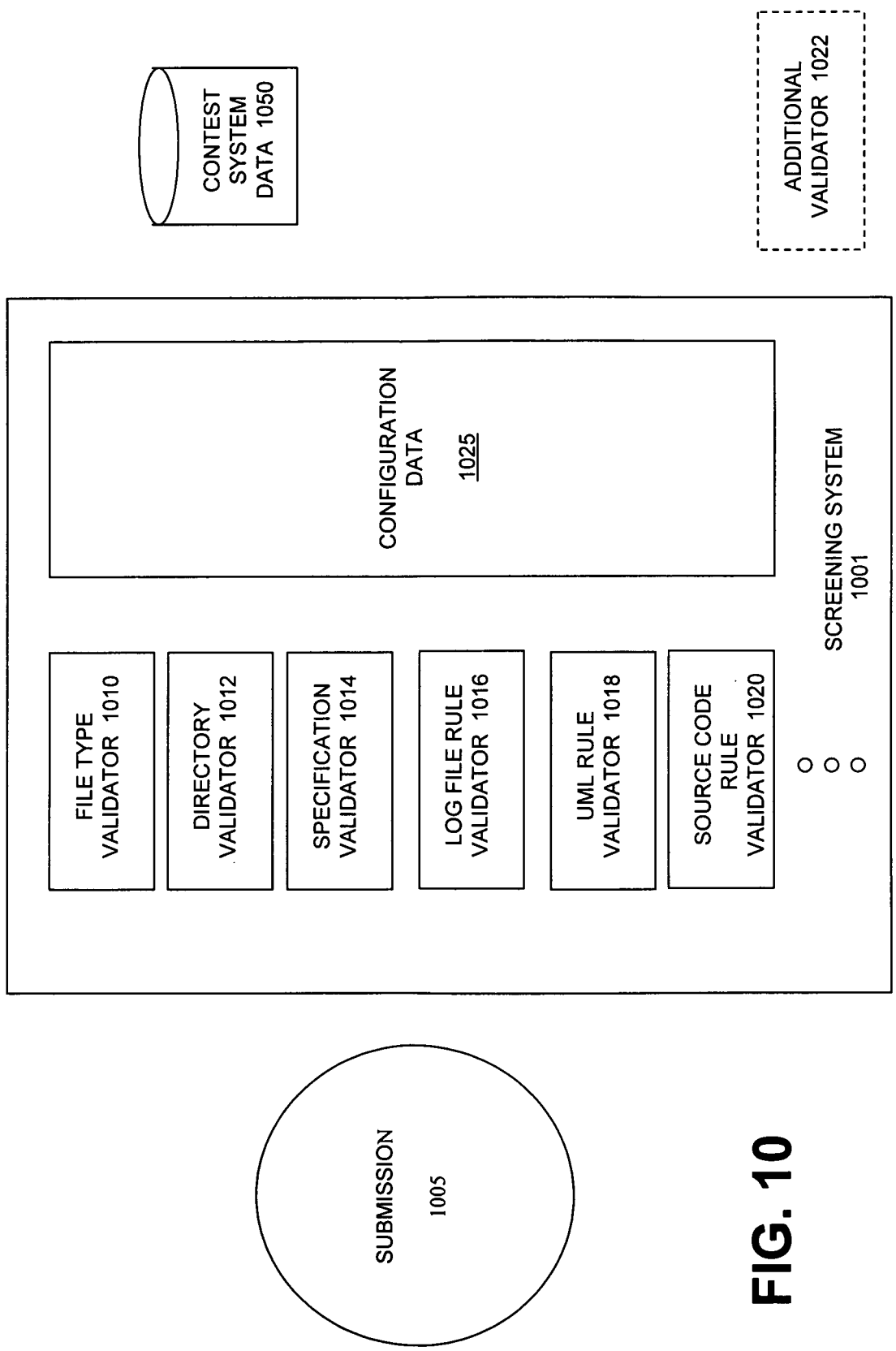
FIG. 10 is a block diagram of an screening system in an embodiment of the invention.

Referring to FIG. 10, an embodiment of a screening system 1001, includes a number of validators 1010-1020. The validators each validate one or more rules. The validators may refer to each other. For example, the Specification validator 1014, may make use of the File Type rule validator 1010 and/or the Directory rule validator 1012, for example, to verify that a specification file is present and in the appropriate directory, and has the proper file type, as well as verifying specific rules regarding the contents of the specification file. The screening system is designed such that additional validators, such as exemplary additional validator 1022 may be used. In this way, additional functionality may be added without requiring redevelopment of the screening too 1001.

Configuration data 1025 is used to configure the screening system and the validator. The configuration data provides to the screening system and the validators the particular information and rules that need to be used in a particular contest. For example, if the submission is to include an essay and a photograph, the specification of the validators to be used (e.g., file type validator 1010, directory validator 1012, etc.) as well as information for the validators may be provided. For example, parameters for the expected file name, directory location, file type, as well as the resolution, format, and size of the image file may be specified as configuration information. Likewise, the expected file name, directly location, file type, and word count may be specified for the essay. In this way, the configuration information may be specific to a particular competition.

It should be understood, that although sometimes described here with reference to software, and particularly useful when implemented with regard to contests for the development of software components, production contests may involve submission of any sort of tangible or intangible object that embodies intellectual property. As non-limiting examples, the techniques could be used for computer hardware and electronics designs, or other designs such as architecture, construction, or landscape design. Other non-limiting examples for which the techniques could be used include the development of all kinds of written documents and content such as documentation and articles for papers or periodicals (whether on-line or on paper), research papers, scripts, multimedia content, legal documents, and more.

What is claimed is:

1. A system for conducting a computer software production contest in which submissions are screened with an initial screening process prior to review by reviewers using a scorecard, the system comprising one or more computers each having at least one memory and at least one processor for executing instructions stored on the at least one memory, the system further comprising:
configuration data for configuring a screening system with information specific to predetermined initial screening requirements of a computer software production contest;

a configurable screening system comprising a plurality of validators, each validator for verifying that submissions meet a particular subset of the predetermined initial screening requirements and for verifying the subset in an automated fashion using validating rules associated with the respective validator and specified in configuration data prior to review of the submissions, wherein the screening system automatically screens contestants' submissions upon receipt of each submission using one or more of the validators and with the screening system configured with the configuration data to verify that the submissions meet the predetermined initial screening requirements prior to review by reviewers using a scorecard, wherein the screening system automatically attempts to correct one or more issues with a particular contestant's submission, wherein the configurable screening system comprises an XML-based validation subsystem in which a desired directory structure is specified in XML, wherein the XML-based validation subsystem is configured to validate a structure of a directory included in a particular submission using a directory rule validator, wherein the directory rule validator initiates file validators on files in the directory based on a configuration file that specifies which of the file validators are added to the directory rule validator, wherein the file validators determine the presence or absence of various properties associated with files;

a pluggable framework for allowing one or more of the validators to be added and/or removed from the configurable screening system to create a set of validators to be applied to the submissions in the computer software production contest, wherein a first set of validators is plugged into the framework for the computer software production contest, and a second, different set of validators is plugged into the framework for a different computer software production contest, such that the configurable screening system does not require redevelopment between the computer software production contest and the different computer software production contest;

a communication subsystem for communicating to contestants requirements for production of a submission and for receiving production competition submissions from some of the contestants; and a contest server for providing to submitting contestants results of whether their submission met the predetermined initial screening requirements and for facilitating a review by reviewers using a scorecard after the screening.

2. The system of claim 1, wherein at least one of the validators comprises a software-based module that performs automatic file-based analysis on the submissions to validate one or more rules.

3. The system of claim 1, wherein at least one of the validators comprises a software-based module that performs automatic analysis on at least one of contents and structure of files and/or directories in the submissions to validate one or more rules.

4. A production contest system comprising one or more computers each having at least one memory and at least one processor for executing instructions stored on the at least one memory, the production contest system further comprising:

a receiver for receiving a production competition submission from a contestant;

a configurable screening system for automatically screening the submission upon receipt of the submission using one or more validators to verify that the submission meets predetermined initial requirements that can be verified in an automated fashion prior to a review process by reviewers using a scorecard, wherein the screening system comprises a plurality of validators, each validator for automatically validating a particular subset of rules specified in configuration data, the configuration data for configuring the screening system for the requirements of a production competition, wherein the screening system automatically attempts to correct one or more issues with the contestant's submission, wherein the configurable screening system comprises an XML-based validation subsystem in which a desired directory structure is specified in XML, wherein the XML-based validation subsystem is configured to validate a structure of a directory included in a particular submission using a directory rule validator, wherein the directory rule validator initiates file validators on files in the directory based on a configuration file that specifies which of the file validators are added to the directory rule validator, wherein the file validators determine the presence or absence of various properties associated with files;

a pluggable framework for allowing one or more of the validators to be added and/or removed from the configurable screening system to create a set of validators to be applied to the production competition submission, wherein a first set of validators is plugged into the framework for the production competition, and a second, different set of validators is plugged into the framework for a different production competition, such that the configurable screening system does not require redevelopment between the production competition and the different production competition; and a communication subsystem for providing to the contestant results of whether the submission meets the predetermined initial requirements based on the verification by the screening system and for facilitating a review by reviewers using a scorecard after the initial screening.

5. The system of claim 4, further comprising, a contest server for authenticating the contestant prior to submission.

6. The system of claim 5, wherein the contest server registers the contestant for participation in the contest prior to submission.

7. The system of claim 4, wherein the predetermined initial requirements comprise requirements for file names, file types, and directory structures.

8. The system of claim 4, wherein the screening system comprises a file type rule validator.

9. The system of claim 4, wherein the screening system comprises a component specification rule validator.

10. The system of claim 4, wherein the screening system comprises a log file rule validator.

11. The system of claim 4, wherein the screening system comprises a UML rule validator.

12. The system of claim 4, wherein the screening system comprises a source code rule validator.

13. The system of claim 4, wherein the screening system comprises a style rule validator.

14. The system of claim 4, wherein the screening system comprises a personal information rule validator that determines whether a submission contains information identifying the submitter.

15. The system of claim 4, wherein the receiver also receives configuration data for configuring the screening system for the requirements of a production competition.

16. The system of claim 4, wherein the contest server further provides to a screener the results of whether the submission meets the predetermined requirements.

17. The system of claim 4, further comprising a review subsystem for conducting a substantive review of the submission by a reviewer, wherein the reviewer is different than the screener.

\* \* \* \* \*